United States Patent [19]
Ries et al.

[11] Patent Number: 5,605,154
[45] Date of Patent: Feb. 25, 1997

[54] TWO-DIMENSIONAL PHASE CORRECTION USING A DEFORMABLE ULTRASONIC TRANSDUCER ARRAY

[75] Inventors: Loriann L. Ries; Stephen W. Smith, both of Durham; Gregg E. Trahey, Hillsborough, all of N.C.

[73] Assignee: Duke University, Durham, N.C.

[21] Appl. No.: 467,003

[22] Filed: Jun. 6, 1995

[51] Int. Cl.⁶ .................................................. A61B 8/00
[52] U.S. Cl. .............................. 128/660.08; 128/667.06
[58] Field of Search ......................... 128/660.01, 660.07, 128/660.08, 661.01, 662.03; 310/334–336

[56] References Cited

U.S. PATENT DOCUMENTS

| | | | |
|---|---|---|---|
| 4,434,799 | 3/1984 | Toenzer | 128/915 X |
| 4,862,892 | 9/1989 | Green | 128/660.07 |
| 4,957,099 | 9/1990 | Hassler | 128/660.03 X |
| 5,166,508 | 11/1992 | Davis et al. | 230/201.9 |
| 5,247,222 | 9/1993 | Engle | 310/328 |
| 5,311,095 | 5/1994 | Smith et al. | 310/334 |
| 5,329,496 | 7/1994 | Smith | 367/140 |
| 5,331,964 | 7/1994 | Trahey et al. | 128/661.01 |
| 5,419,329 | 5/1995 | Smith et al. | 128/661.01 |
| 5,438,554 | 8/1995 | Seyed-Bolorforosh et al. | 128/662.03 X |

OTHER PUBLICATIONS

Hardy; Adaptive Optics; *Scientific American;* Jun. 1994; pp. 60–65.

Ries et al.; Phase Aberration Correction in Two Dimensions Using a Deformable Array Transducer; *Ultrasonic Imaging,* vol. 17, No. 1; Jan. 1995; p. 62.

*Primary Examiner*—Francis Jaworski
*Attorney, Agent, or Firm*—Bell, Seltzer, Park & Gibson

[57] ABSTRACT

A medical ultrasound array transducer assembly for achieving two-dimensional phase correction of an aberrated ultrasound beam is disclosed. The array transducer assembly comprises a plurality of transducer elements and is configured for insertion in or contacting to the human body. The two-dimensional phase correction comprises mechanically correcting ultrasound beam phase errors in a first dimension, and electronically correcting ultrasound beam phase errors in a second dimension. The transducer array assembly requires significantly fewer channels than a standard array which used for two-dimensional phase correction.

26 Claims, 20 Drawing Sheets

ELECTRONIC PHASE CORRECTION

MECHANICAL PHASE
CORRECTION

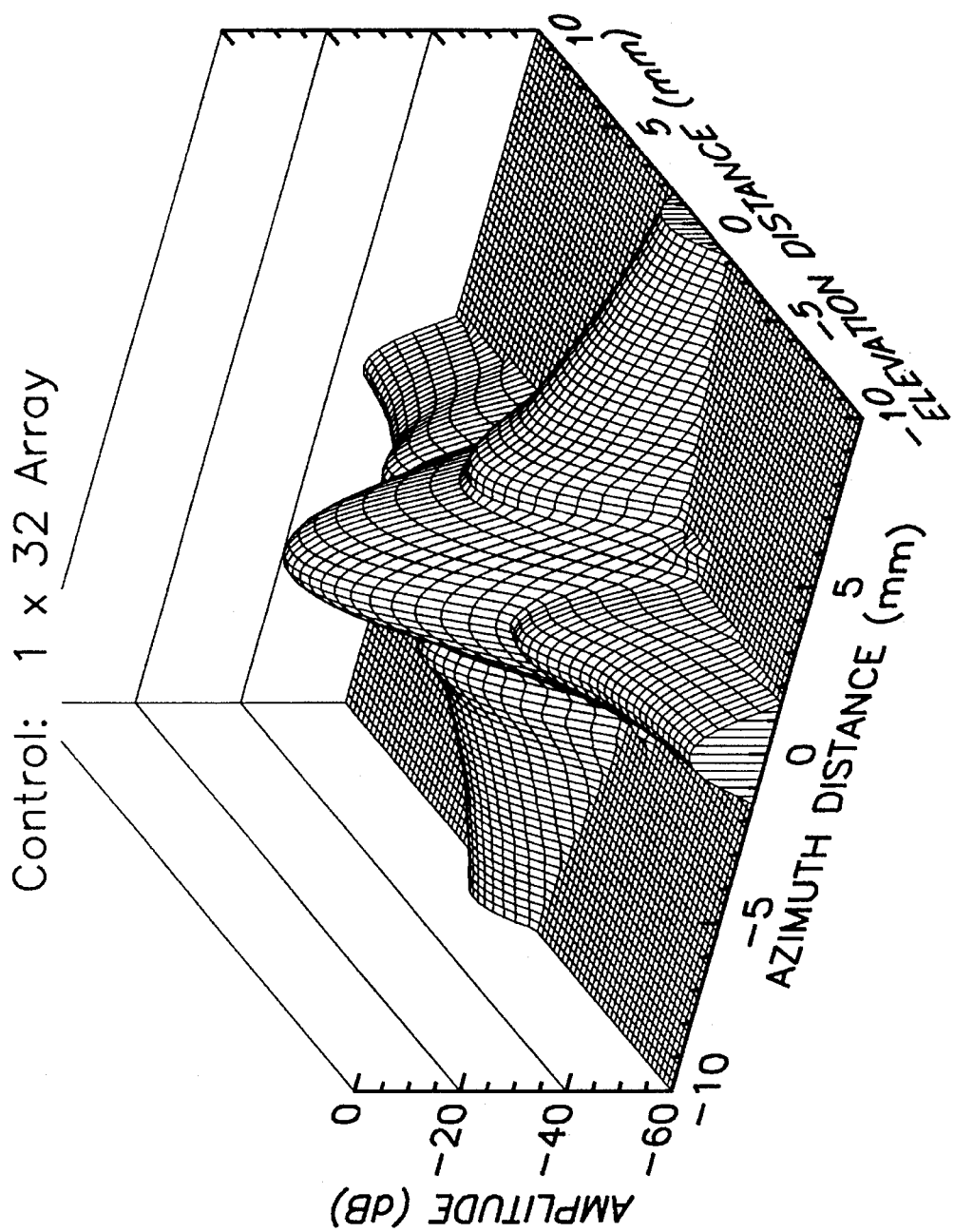

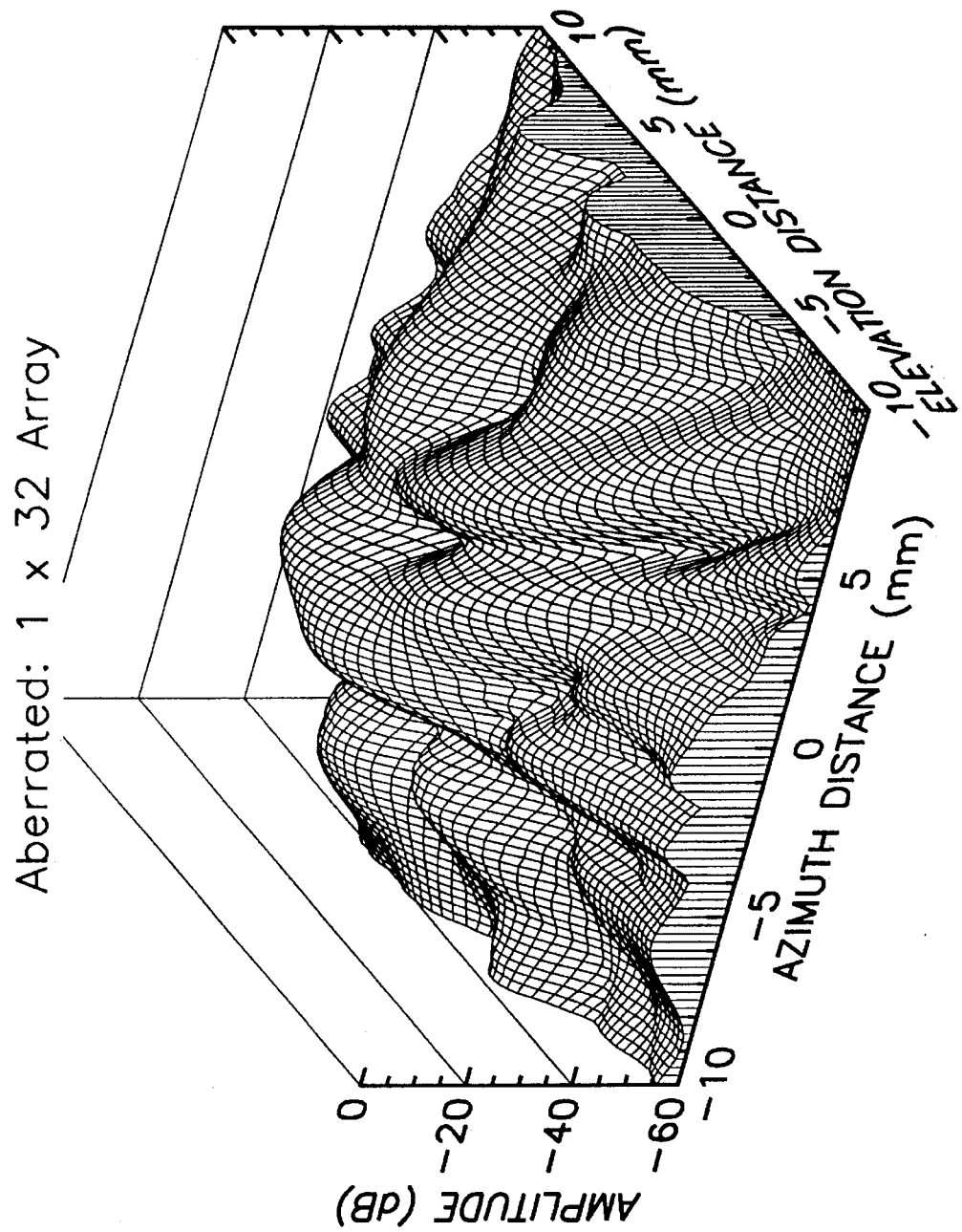

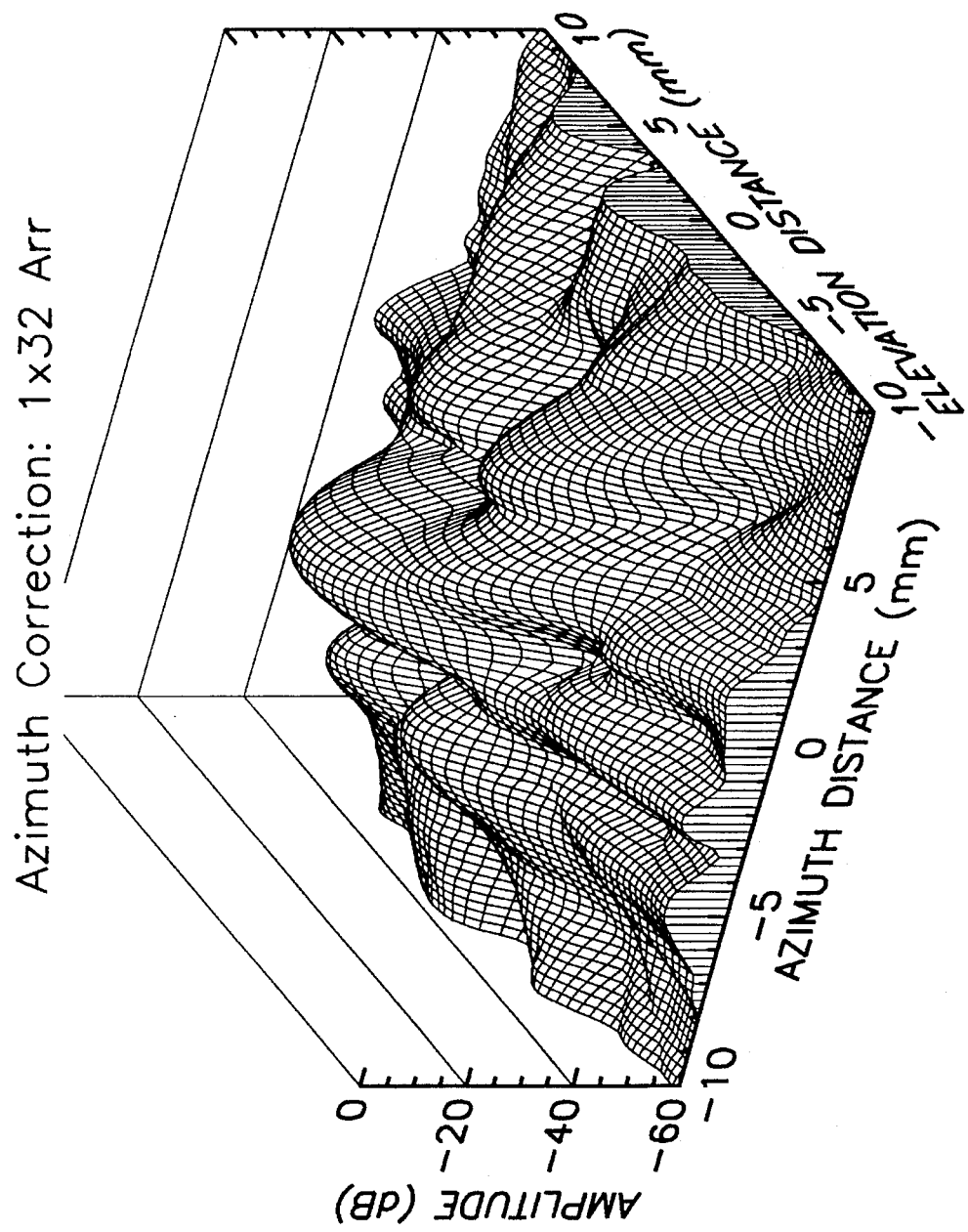

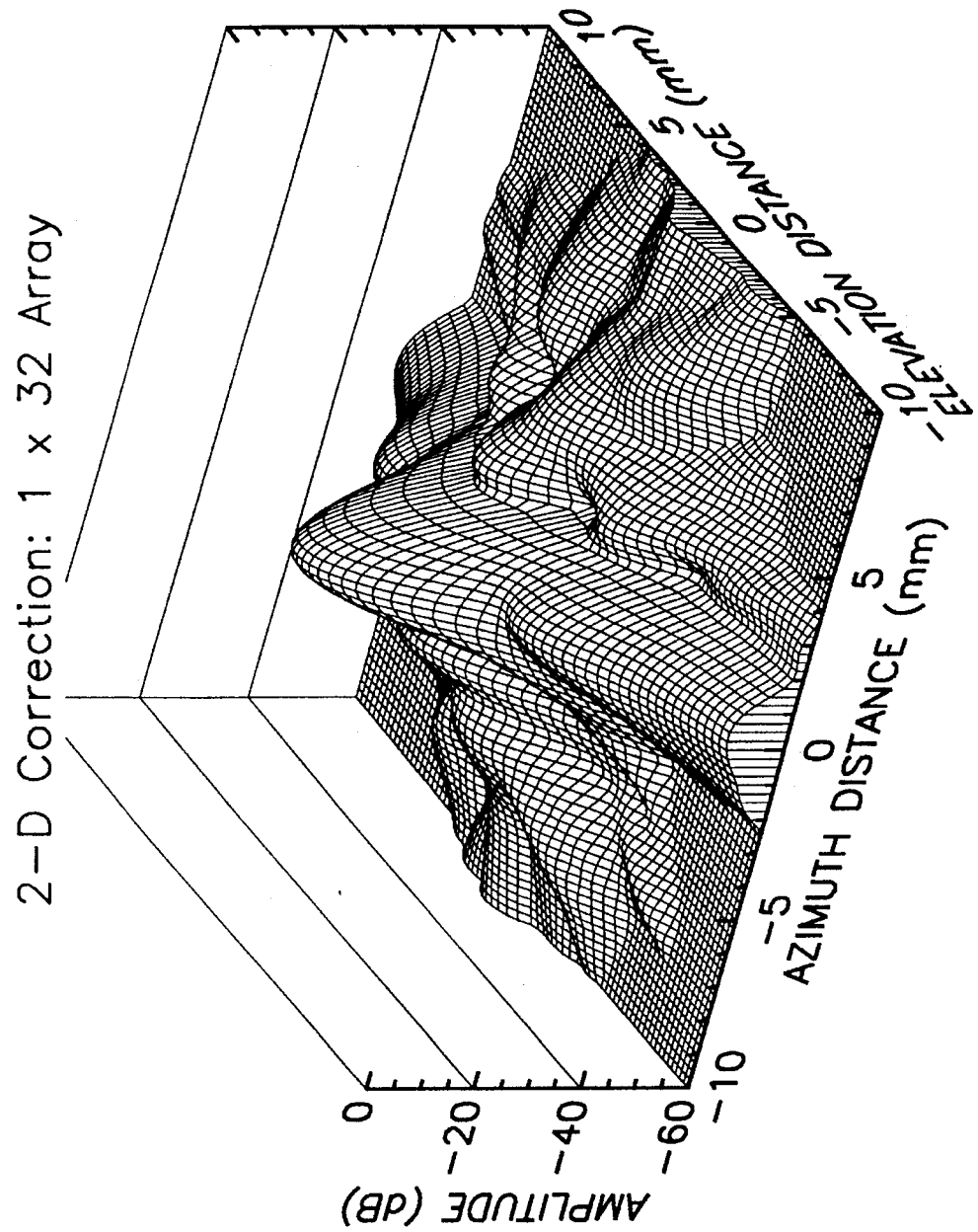

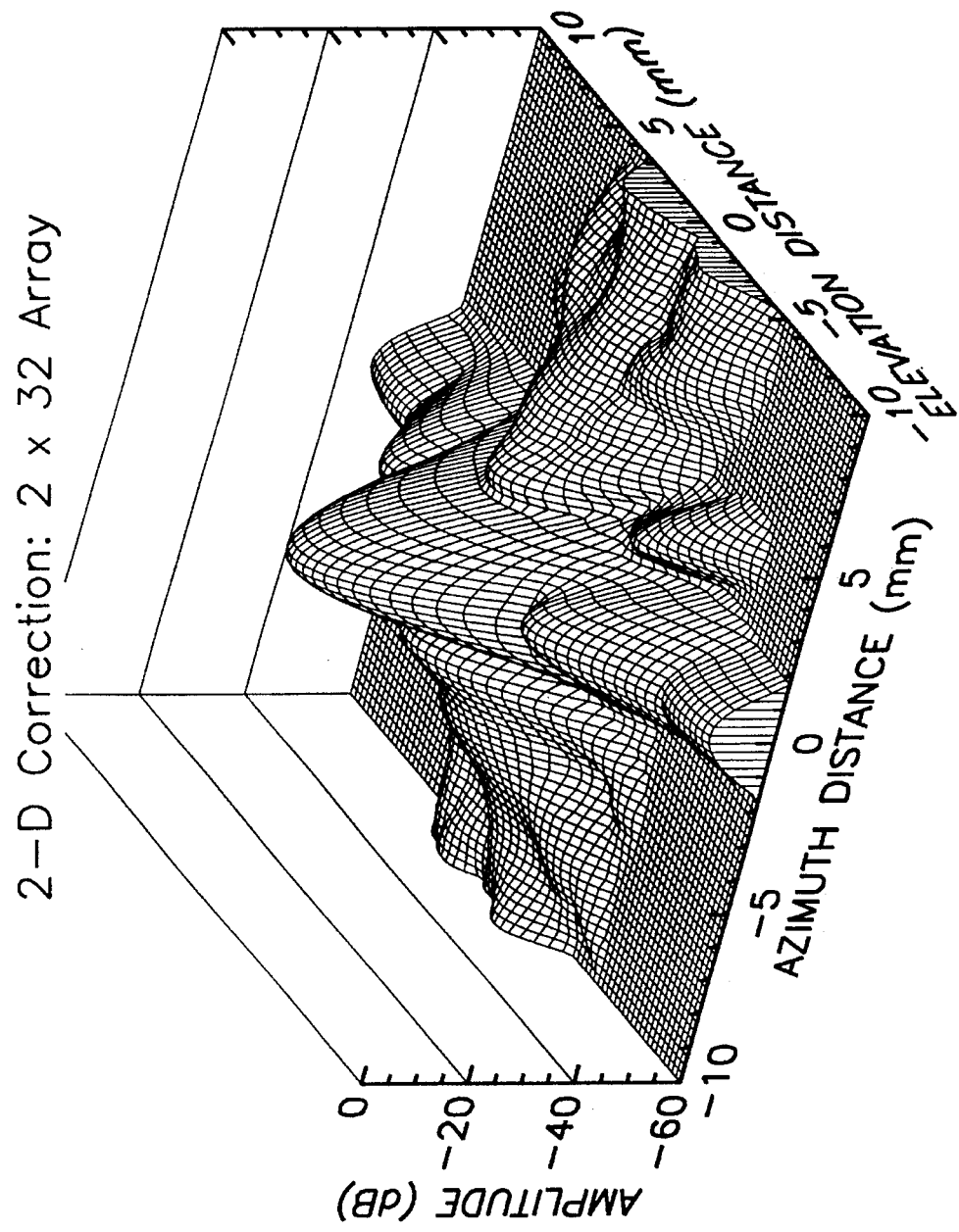

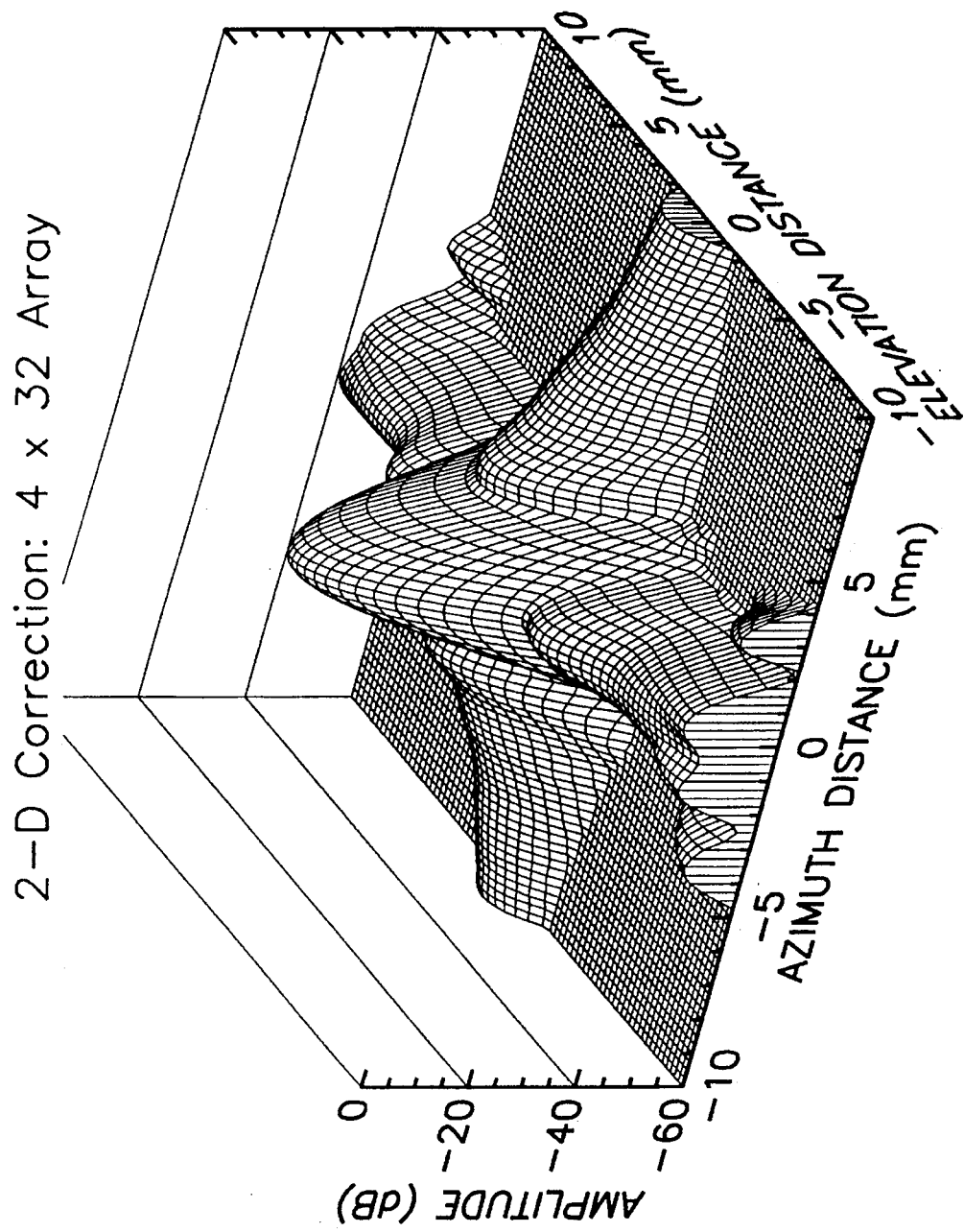

TWO-DIMENSIONAL PHASE CORRECTION USING A DEFORMABLE ULTRASONIC TRANSDUCER ARRAY

This invention was made with government support under Grant No. CA 56475 awarded by the National Institutes of Health. The government has certain rights in the invention.

FIELD OF THE INVENTION

The present invention relates to arrays of ultrasonic transducers and, more particularly, to improvements in the correction of two-dimensional phase aberrations in an ultrasound beam.

BACKGROUND OF THE INVENTION

Phased array ultrasound imaging systems assume a constant acoustic velocity in human tissue of 1540 meters per second (m/s) which is used to compute delays for steering and focusing the ultrasound beam. However, due to tissue inhomogeneities and varying tissue thicknesses the different components of the ultrasound beam arrive at the focus out of phase. One way to correct these phase errors is to adjust the electronic phase delay of each element to compensate for the aberrating tissue. The process of restoring the ultrasound beam focus by correcting the phase errors is called phase correction.

Algorithms for real-time ultrasound phase correction are known. One method, by Flax et al., (*IEEE Transactions on Ultrasonics, Ferroelectrics, and Frequency Control* 35, 758–767, 1988), uses cross-correlation to extract the phase error profile. In this method, individual phase differences between adjacent elements are calculated. The calculated phase error at each element is then a summation of the individual phase differences across the array. By subtracting the calculated phase error for each element from the electronic phase delays, the ultrasound beam is restored.

Another method originally described by Nock et al., (*The Journal of the Acoustical Society of America*, vol. 85, 1819–1833, 1989) and recently improved by Ng et al. (*IEEE Transactions on Ultrasonics, Ferroelectrics and Frequency Control* 41, 631–643, 1994), uses speckle brightness as a quality factor to determine the phase error profile. In this method, an iterative process maximizes the speckle brightness for a given region and the corresponding phase error profile for that region is then calculated. Once again, the ultrasound beam is restored by subtracting the calculated phase error for each element from the electronic phase delay.

Ultrasound phase aberration in tissue is present in two dimensions. Freiburger et al. (*Ultrason. Imaging* 14, 398–414, 1992) reported an average root mean square (rms) magnitude of 55.3 nanoseconds (ns) for two-dimensional phase aberration profiles which were measured across the breast. Sumino et al. (*The Journal of the Acoustical Society of America*, vol. 90, 2924–2930, 1991) measured arrival time differences through excised abdominal wall tissue and found an average standard deviation of 25.6 ns.

In order to correct the total phase aberration in tissue, a two-dimensional correction should be implemented. Since phase correction methods in ultrasound compensate for the aberrating tissue by adjusting the computed electronic phase delays of the array, a two-dimensional array would be required to completely correct the two-dimensional aberrations in tissue.

Unfortunately, a simple 3.5 MHz two-dimensional array capable of two-dimensional phase correction may consist of 128 elements in azimuth by at least 4 elements in elevation which leads to a total of 512 elements in a 28 millimeter (mm) by 8 mm area. This large number of elements requires an equivalent number of effective channels in the ultrasound system. Furthermore, the small element size means that each element has a high electrical impedance which reduces the sensitivity compared to larger array elements. Goldberg et al. (*IEEE Transactions on Ultrasonics, Ferroelectrics, and Frequency Control* 41, 761–771, 1994). The large number of elements and reduced sensitivity of two-dimensional arrays make them an unattractive option for phase correction for reasons of cost, electrical power consumption, and length of signal processing time of the system.

SUMMARY OF THE INVENTION

It is therefore an object of the present invention to provide a method and apparatus for achieving two-dimensional phase correction of an ultrasound beam using significantly fewer channels than a full two-dimensional array.

It is yet another object of the present invention to provide a method and apparatus for achieving the phase correction image quality of a more densely sampled two-dimensional array.

These and other objects are provided according to one aspect of the present invention by a medical ultrasound array transducer assembly configured for insertion in or contacting to the human body and having two-dimensional phase correction capability. The transducer assembly comprises a base member, a plurality of transducer elements secured to the base member, and at least one actuator connected to the base member and to at least one of the transducer elements. The actuator is capable of deflecting connected transducer elements relative to at least one other transducer element. A transducer element may be deflected by at least ±1° by an actuator. An actuator has a frequency response of at least 1 KHz and may be a piezoelectric ceramic.

Each one of the plurality of transducer elements comprises an acoustically attenuating layer connected to the upper surface of an actuator, a piezoelectric transducer chip connected to the attenuating layer, and a matching layer having an upper surface and a lower surface wherein the lower surface of the matching layer is connected to the piezoelectric transducer chip. The attenuating layer and the matching layer may be polyimide. The piezoelectric transducer chip may be a lead zircanate titanate (PZT) chip. The transducer assembly may comprise means associated with each of the plurality of transducer elements, for electronically correcting ultrasound beam phase errors.

According to another aspect of the present invention, a medical ultrasound array transducer system configured for insertion in or contacting to the human body and having two-dimensional phase correction capability comprises a transducer array assembly and a base unit operatively associated with the transducer array assembly. The transducer array assembly comprises a base member, a plurality of transducer elements secured to the base member, and at least one actuator connected to the base member and at least one of the transducer elements for deflecting a transducer element relative to at least one other transducer element. The base unit comprises control means associated with at least one actuator for mechanically correcting ultrasound beam phase errors in a first dimension.

According to another aspect of the present invention, a method for achieving two-dimensional phase correction of an aberrated ultrasound beam received by a medical ultrasound array transducer assembly comprising a plurality of transducer elements and configured for insertion in or contacting to the human body comprises the steps of mechanically correcting ultrasound beam phase errors in a first dimension, and electronically correcting ultrasound beam phase errors in a second dimension. The step of mechanically correcting ultrasound beam phase errors in a first dimension comprises tilting the plurality of transducer elements. The step of electronically correcting ultrasound beam phase errors in a second dimension comprises altering the electronic phase delay of the plurality of transducer elements. The step of mechanically correcting ultrasound beam phase errors in a first dimension and the step of electronically correcting ultrasound beam phase errors in a second dimension may occur simultaneously.

According to yet another aspect of the present invention, a method for focusing an ultrasound beam in two dimensions by a medical ultrasound array transducer assembly comprising a plurality of transducer elements and configured for insertion in or contacting to the human body comprises the steps of mechanically focusing the ultrasound beam in a first dimension, and electronically focusing the ultrasound beam in a second dimension. The step of mechanically focusing the ultrasound beam in a first dimension comprises tilting the plurality of transducer elements. The focused ultrasound beam may be transmitted or received by the transducer assembly.

BRIEF DESCRIPTION OF THE DRAWINGS

FIG. 5A is a 3-D beam plot simulation of a 1×32 control array without phase aberration;;

FIG. 6A is a 3-D beam plot simulation of a 1×32 array with phase aberration;

FIG. 7A is a 3-D beam plot simulation of a 1×32 array with phase aberration and electronic phase correction in azimuth;

FIG. 8A is a 3-D beam plot simulation of a 1×32 array with phase aberration, electronic phase correction in azimuth, and mechanical phase correction in elevation;

FIG. 9A is a 3-D beam plot simulation of a 2×32 array with phase aberration, electronic phase correction in azimuth, and mechanical phase correction in elevation;

FIG. 10A is a 3-D beam plot simulation of a 4×32 array with phase aberration and electronic phase correction in azimuth and elevation;

DETAILED DESCRIPTION OF PREFERRED EMBODIMENTS

Figure 1:
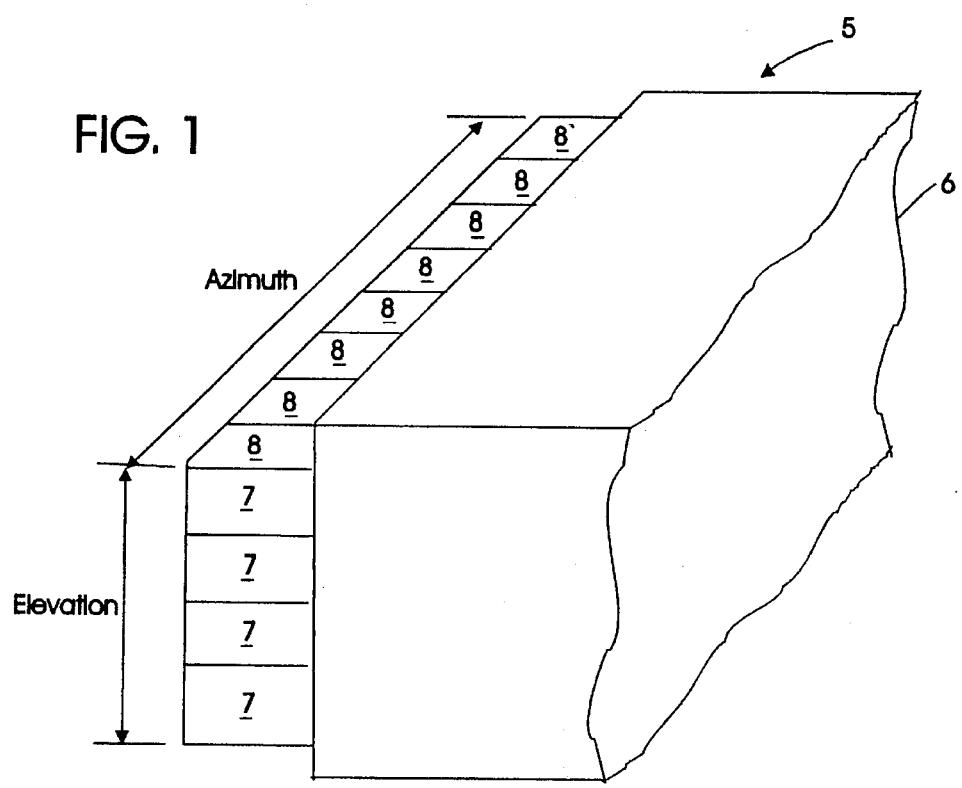
FIG. 1 illustrates a two-dimensional array with a two-dimensional aberrator.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout.

FIG. 1 illustrates a two-dimensional phased array transducer 5 with a two-dimensional aberrator 6 modeled as a subcutaneous fat layer of varying thickness. This array has four elements 7 in elevation; however, only eight elements 8 in azimuth are illustrated for simplicity. Uses for the transducer array illustrated in FIG. 1 include three dimensional ultrasound imaging or volumetric measurements and thin slice ultrasound imaging. See for example U.S. Pat. No. 5,311,095 to Smith et al., which is incorporated herein by reference in its entirety.

Figure 2A:
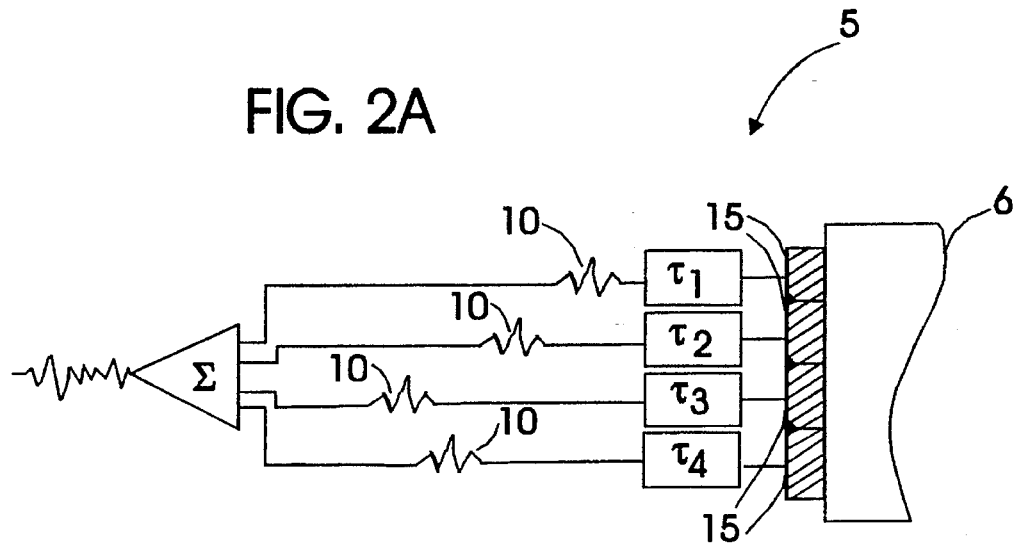
FIG. 2A is an elevation profile of a two-dimensional array without phase correction.
Figure 2B:
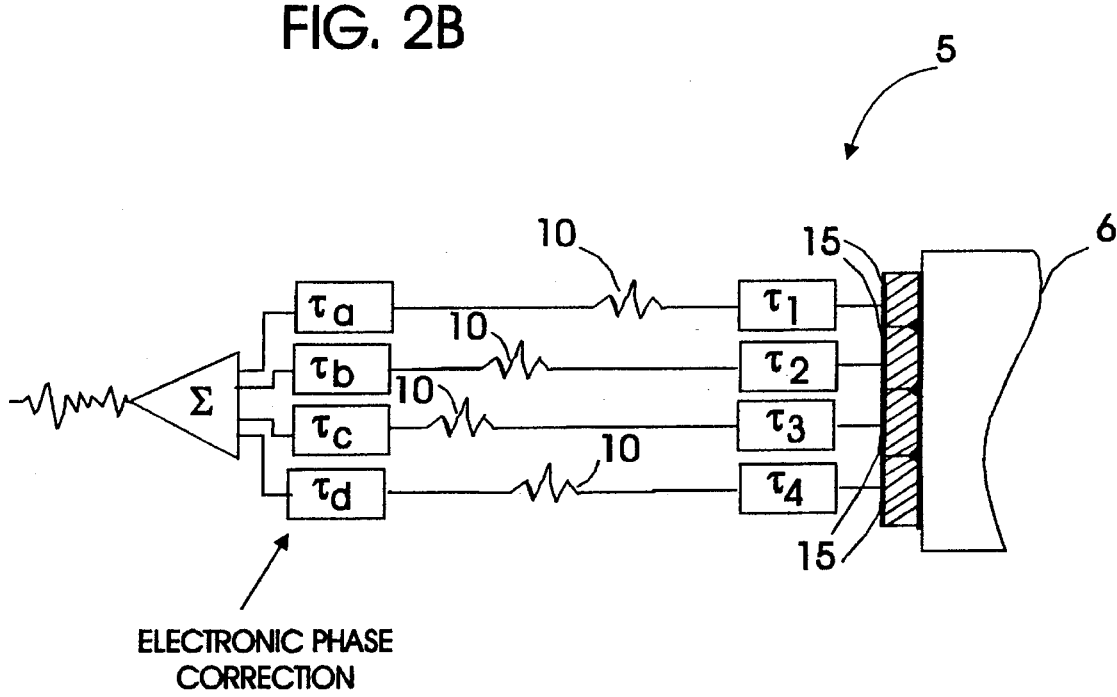
FIG. 2B is an elevation profile of a two-dimensional array with electronic phase correction.

Referring now to FIGS. 2A and 2B, a method of ultrasound phase correction by adjusting the electronic phase delay of the transducer array elements 15, is illustrated. The azimuth dimension is out of the paper, and the computed electronic delays used for elevation focusing are represented as $\tau_1$–$\tau_4$. Without any adjustment of the electronic phasing, i.e., without phase correction, the returning echoes 10 arrive at the transducer array elements 15 from an adjacent aberrating layer 6 and proceed to the summing amplifier (Σ) out of phase as shown in FIG. 2A. By adjusting the electronic phase delays with $\tau_a$–$\tau_d$, the returning echoes 10 now add in phase as shown in FIG. 2B.

Figure 3A:
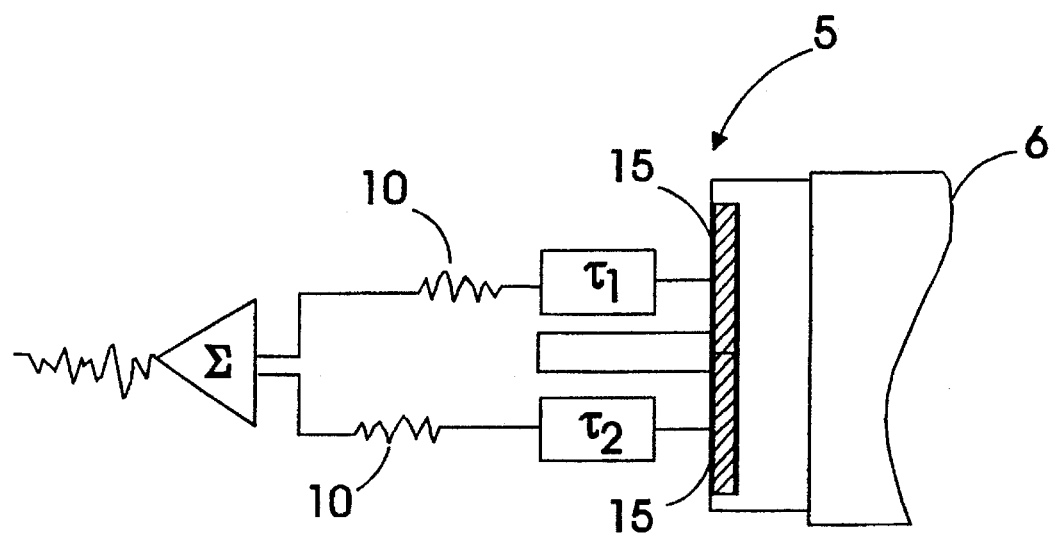
FIG. 3A is an elevation profile of a deformable array without phase correction.
Figure 3B:
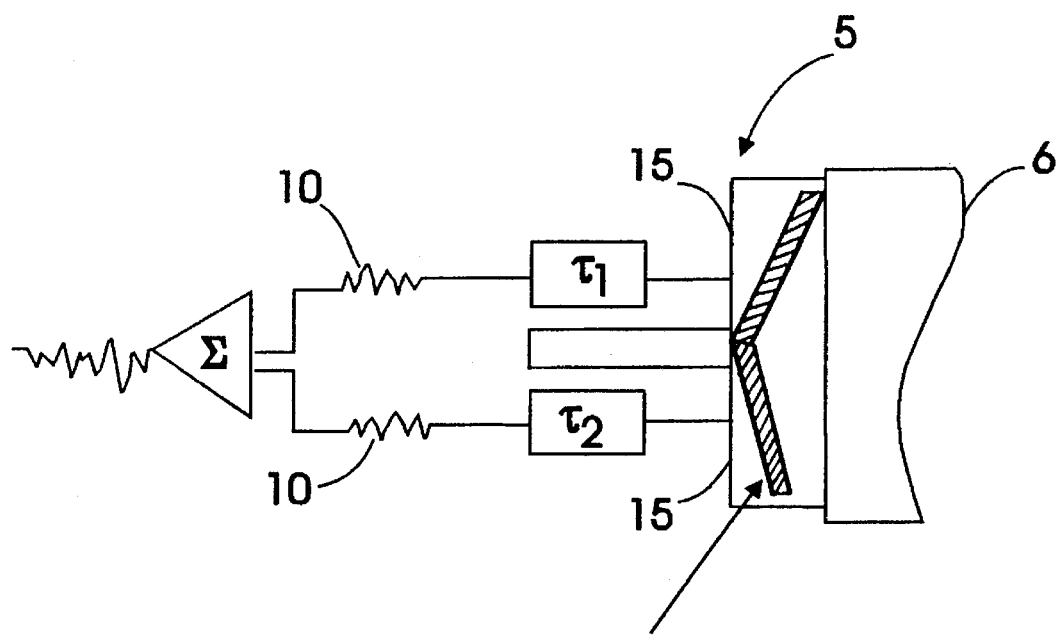
FIG. 3B is an elevation profile of a deformable array with the elements tilted for mechanical phase correction.

An alternate method of phase correction by mechanically altering the physical location of transducer array elements 15 with actuators 16 is illustrated in FIGS. 3A and 3B. This technique is shown with the computed electronic delays for azimuth steering and focusing represented as $\tau_1$ and $\tau_2$ for a 2×N array. Two transducer array elements are drawn in profile to show the elevation dimension in FIG. 3A. The transducer array element 15 size in elevation is large enough that the effect of the aberrator 6 is averaged in elevation; therefore, the transducer array elements cannot be used to correct phase aberrations in elevation by simply adjusting $\tau_1$ and $\tau_2$. FIG. 3A shows the transducer 5 without phase correction. The elements are not moved, and the returning echoes 10 are not in phase. In order to partially correct the phase aberration in elevation, the transducer array elements 15 can be mechanically tilted in elevation. FIG. 3B shows the transducer array elements 15 tilted in elevation to compensate for the aberrating tissue 6, and the returning echoes 10 are now in phase. By combining both methods, mechanically altering the transducer array element 15 position, and adjusting the electronic phase delay of the transducer array element, two-dimensional phase correction can be achieved without a full two-dimensional array.

Effectively, phase correction in azimuth is accomplished by altering the electronic phase delay of the transducer array elements 15. However, phase correction in elevation is accomplished by tilting the transducer array elements 15 in elevation with an actuator 16. Tilting the transducer array elements 15 in elevation will only remove the linear component, or the steering error, of the phase error in elevation. Since this technique is capable of removing the steering error from each transducer array element 15, the technique eliminates the problem of adjacent azimuthal transducer array elements steering in different elevation directions. Thus, a deformable transducer array of 1×128 (128 elements) or 2×128 (256 elements) approaches phase correction image quality of a more densely sampled two-dimensional array, for example, an array of 4×128 elements or more.

Figure 4:
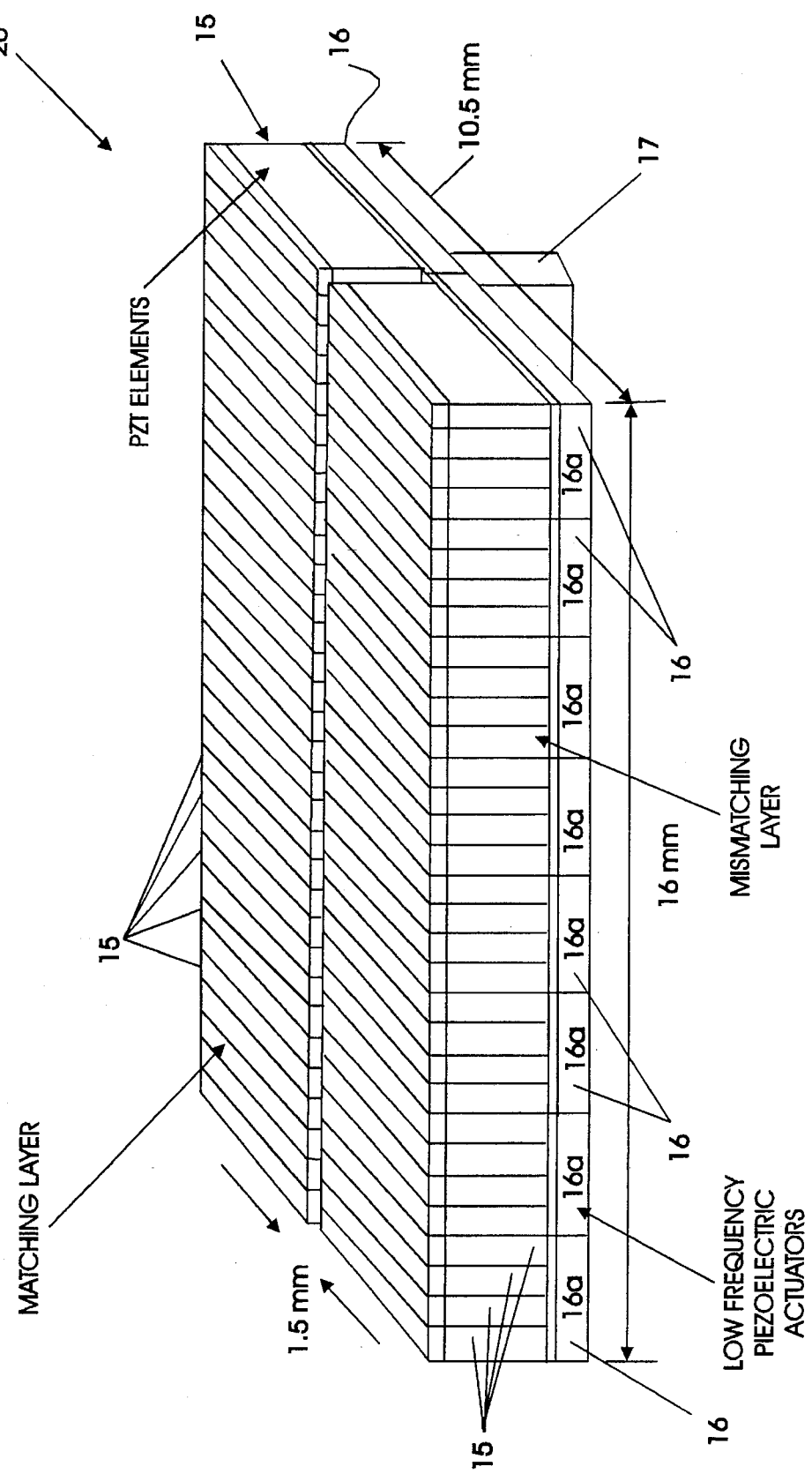
FIG. 4 is a schematic of a 2×32 deformable array.

Referring now to FIG. 4, the deformable array, according to the present invention, is illustrated for a transducer array 20 of 2 elements 15 in elevation by 32 elements 15 in azimuth. The 2×32 transducer is mounted on an array of low frequency piezoelectric actuators 16. In the illustrated embodiment, every four transducer array elements 15 in azimuth are mounted on one independently controlled actuator 16 capable of tilting the elements in elevation. Since the actuators 16 must alter the element 15 position in elevation, they are mounted on a central pedestal 17 with eight actuators mounted as cantilevers on either side of the pedestal. The cantilevered end 16a of each actuator 16 is capable of moving up and down in the axial direction, thereby altering the transducer array element 15 position in elevation. By mounting the transducer array 20 on a substrate of actuators 16, the transducer array 20 is deformable in elevation. A two-dimensional correction may be implemented by tilting the transducer array elements 15 in elevation for the elevation phase correction, and by adjusting the electronic phase delay of the elements for the azimuth phase correction.

The phase correction process for the array shown in FIG. 4 was modeled using a broadband simulation based on the method of Stepanishen, (*The Journal of the Acoustical Society of America*, vol. 49, 841–849, 1971), using software developed by Jensen et al., (*IEEE Transactions on Ultrasonics Ferroelectrics, and Frequency Control* 39, 262–267, 1992). Simulated beam plots were used to assess and compare the radiation patterns of transducers with and without the presence of phase aberration. In addition to the beam plots, B-scan images of anechoic cysts embedded in tissue were simulated (not shown). Each scan line was created by the complex summation of the backscattered signal from a volume of randomly placed point scatterers with an average of 15 scatterers per resolution volume. A spherical void in the center of the volume with a diameter of 5 mm represented the cyst. The transducer was then incrementally scanned a distance of 20 mm in the azimuth direction at 0.25 mm increments and the resultant radio frequency (rf) lines were detected by Hilbert transform and displayed as a gray scale image.

In order to simulate phase correction, a subset of the phase aberration data measured in vivo by Freiburger et al., (*Ultrason. Imaging* 14, 398–414, 1992), in human breast (interpolated to yield 197 MHz sampling) was used to degrade beam plots generated with the broad band simulation program. For the simulations, the aberrator was assumed to be a thin phase screen located near the transducer. Due to the undersampling of the measured aberrator in elevation, the data was interpolated using MATLAB (The Math Works, Inc., Natick, Mass.), resulting in 0.67 samples/mm. Simulated phase correction techniques for a phased array transducer (10.5 mm in elevation by 16 mm in azimuth with a kerf of 0.087 mm, a 3.5 MHz center frequency, a 70 mm focus, and a Gaussian pulse with 60% −6 dB bandwidth) were compared for the following cases:

1. a 1×32 control array without phase aberration;
2. a 1×32 array with electronic phase correction in azimuth only;
3. a 1×32 deformable array with electronic phase correction in azimuth and mechanical phase correction in elevation;
4. an idealized 2×32 array (with no kerf in elevation) with electronic phase correction in azimuth and mechanical phase correction in elevation;
5. a 4×32 array with electronic phase correction in azimuth and elevation.

The phase correction techniques were evaluated by examining the largest −6 dB and −18 dB beam widths and respective rms phase error as summarized in Table 1 below.

TABLE 1

| SIMULATION | WORST CASE BEAM WIDTHS | | RMS PHASE ERROR |
| --- | --- | --- | --- |
| | −6 dB (mm) | −18 dB (mm) | (ns) |
| Control | 2.6 | 4.6 | 0 |
| Aberrated | 4.6 | 9.2 | 77.7 |
| Electronic Phase Correction in Azimuth 1 × 32 Array | 3.7 | 8.1 | 47.9 |
| Electronic Phase Correction in Azimuth and Mechanical Correction in Elevation 1 × 32 Array | 2.8 | 5.0 | 25.4 |
| Electronic Phase Correction in Azimuth and Mechanical Correction in Elevation 2 × 32 Array | 2.6 | 4.6 | 20.4 |
| Electronic Phase Correction in Two Dimensions with a 4 × 32 Array | 2.6 | 4.6 | 14.5 |

CASE 1

Figure 5B:
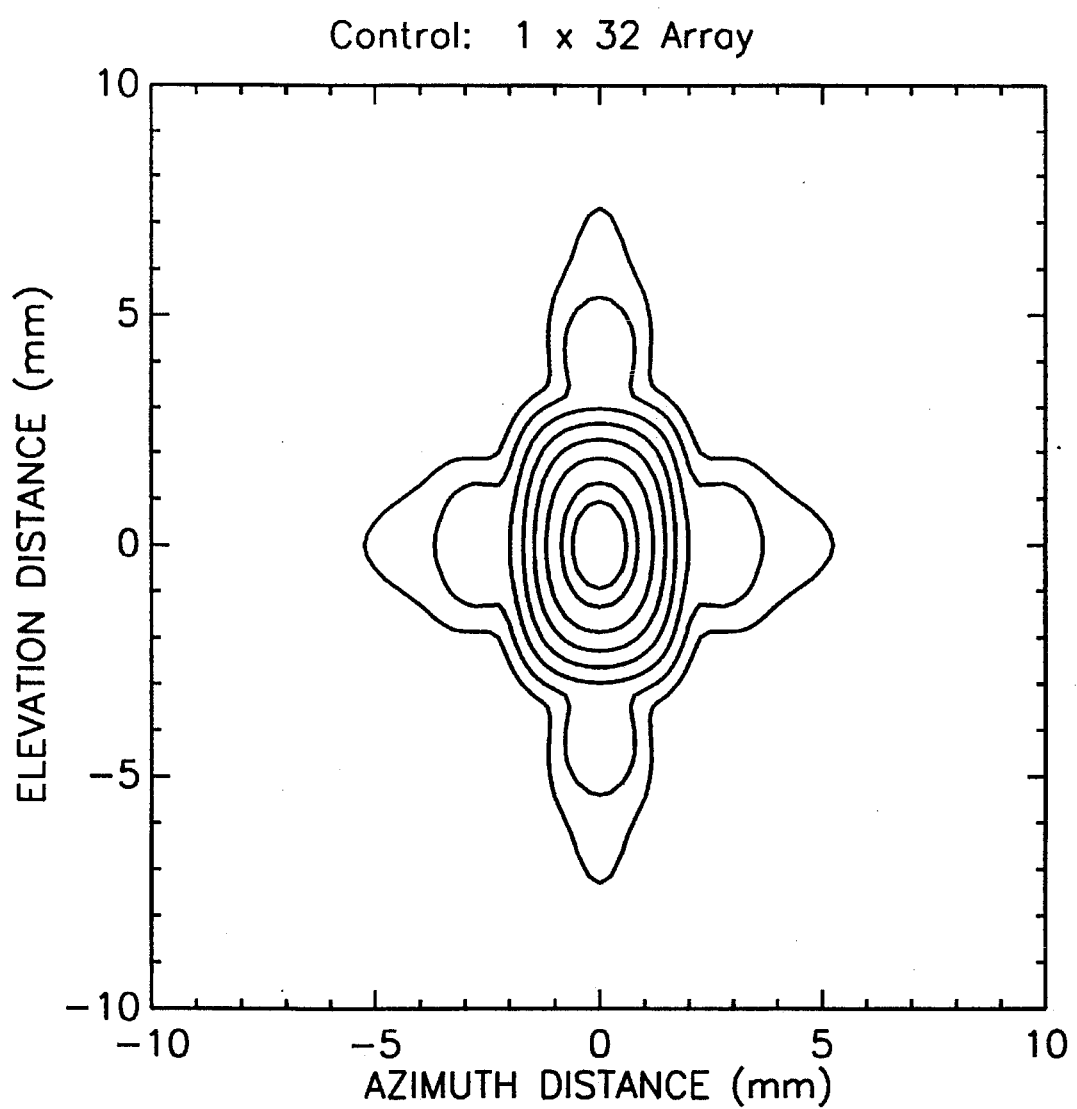
FIG. 5B is a contour plot simulation of a 1×32 control array without phase aberration.
Figure 6B:
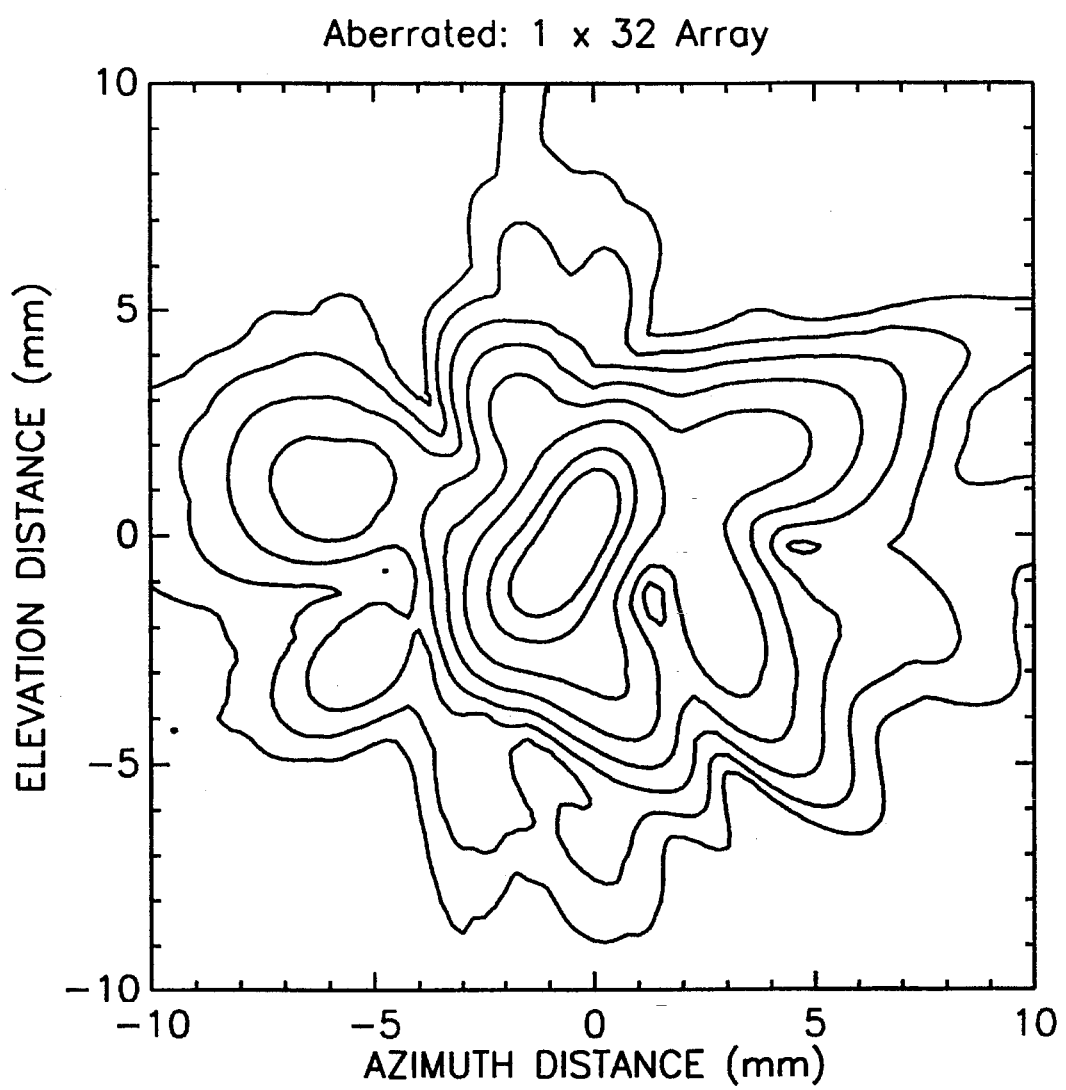
FIG. 6B is a contour plot simulation of a 1×32 array with phase aberration.

The beam plot and contour map, shown in FIGS. 5A and 5B, respectively, were generated without the aberrator applied and represent the control case of an idealized array. The −6 dB and −18 dB worst case beam widths were 2.6 mm and 4.6 mm, respectively, for the control beam plot. The beam plot and contour map for the same array with the aberrator added are illustrated in FIGS. 6A and 6B, respectively. The average rms error of the aberrator was 77.7 ns (including the planar component) and the aberration disrupts the main beam and increases the side lobe level of the beam plot. The worst case aberrated beam widths were 4.6 mm at −6 dB and 9.2 mm at −18 dB.

CASE 2

Next, the azimuth aberrator was removed by subtracting the average aberration over the elevation dimension for each element leaving a residual rms error of 47.9 ns. Approximating the aberrator as a quadratic polynomial, $\psi(x,y)$, the aberrator is:

$$\psi(x,y)=A+Bx+Cy+Dx^2+Exy+Fy^2$$

where x represents the azimuth direction and y represents the elevation direction. Electronic phase correction in azimuth ideally removes the presence of the aberrator in azimuth leaving:

$$\psi'(x,y)=Cy+Exy+Fy^2$$

Figure 7B:
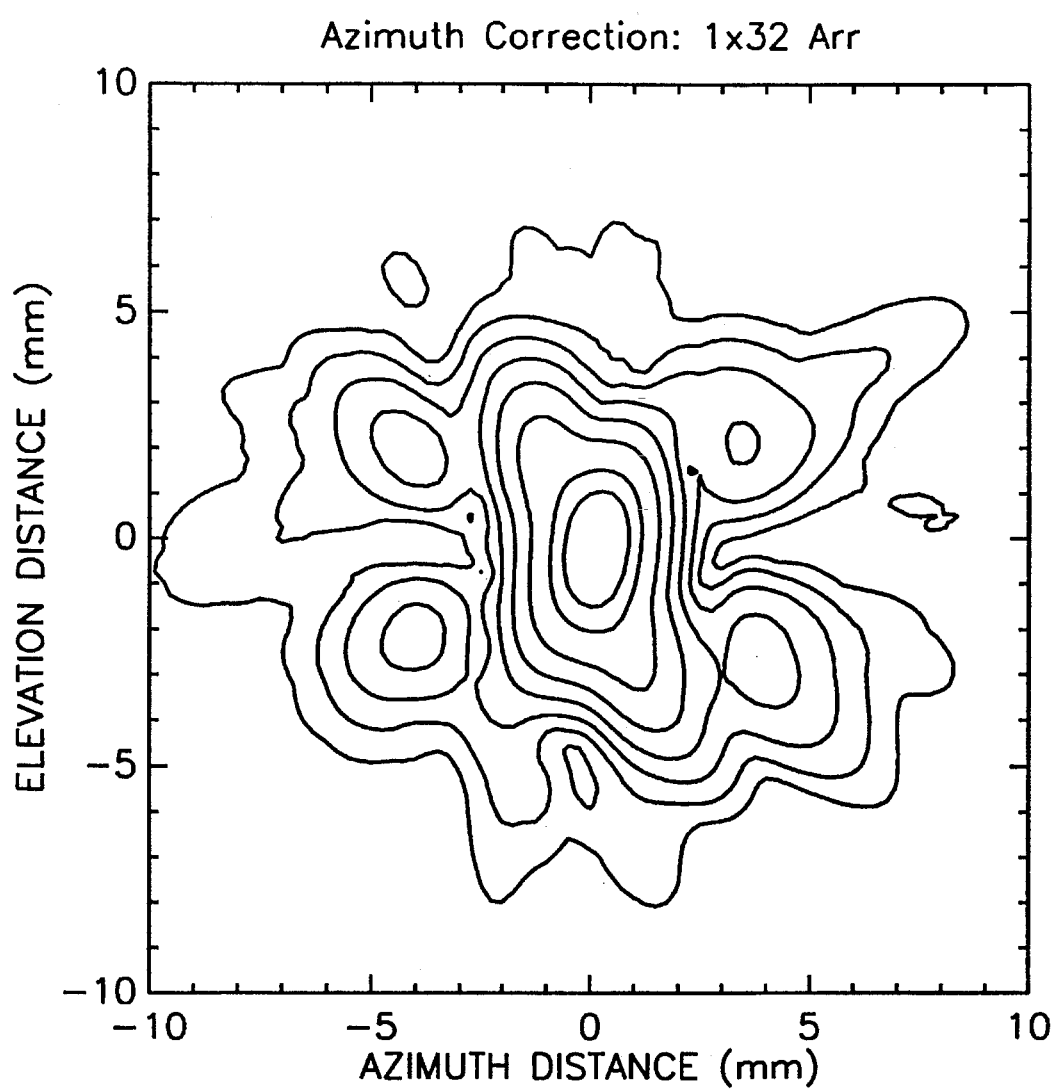
FIG. 7B is a contour plot simulation of a 1×32 array with phase aberration and electronic phase correction in azimuth.

The beam plot and contour map for a 1×32 array when phase correction was applied only in azimuth are illustrated in FIGS. 7A and 7B, respectively. The main beam of the beam plot has been restored to a more regular shape. However, the beam plot is still severely degraded compared to the control beam plot (FIG. 5A). For phase correction only in azimuth, the worst case beam widths at −6 dB and −18 dB were 3.7 mm and 8.1 mm, respectively.

CASE 3

Figure 8B:
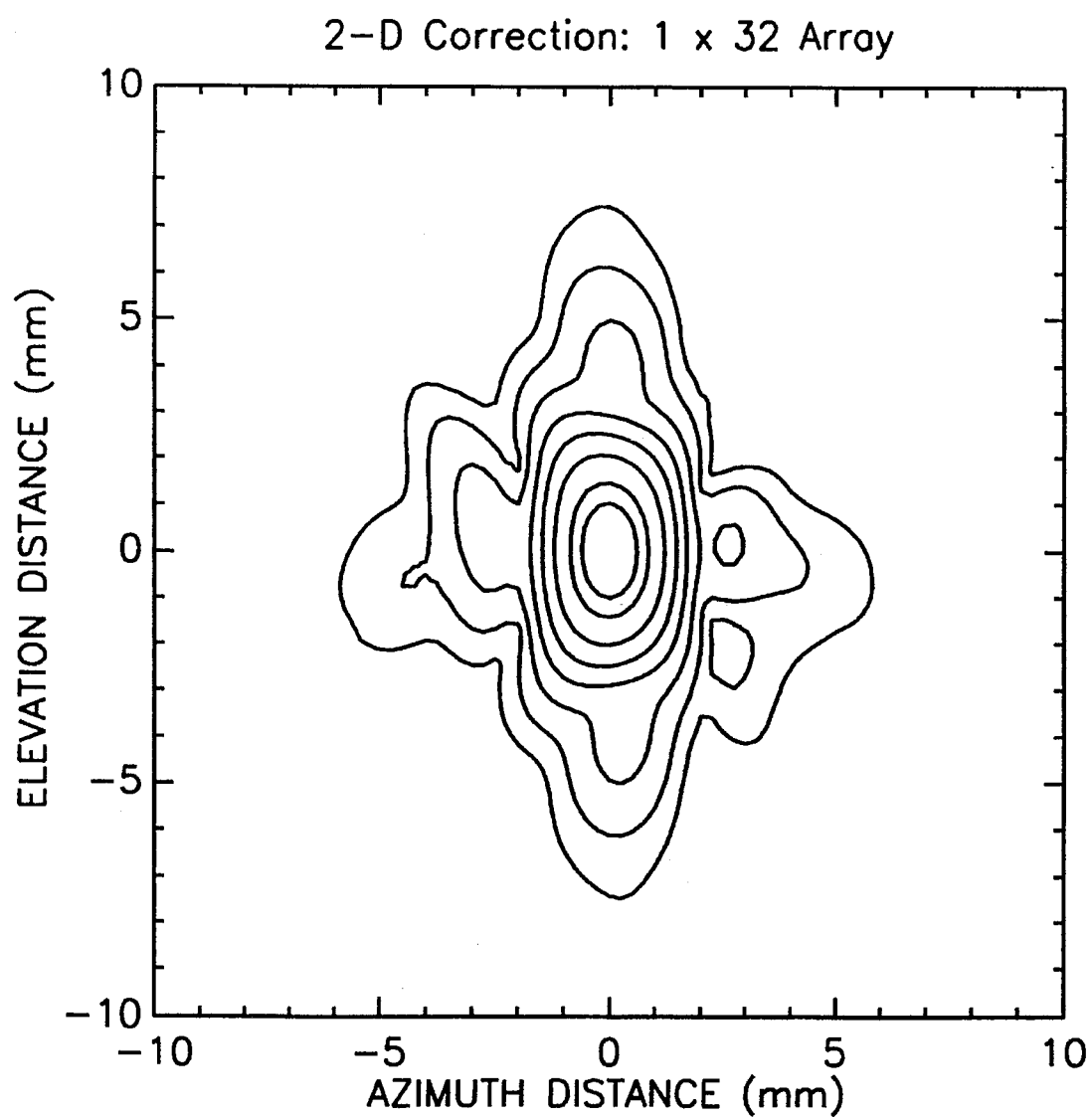
FIG. 8B is a contour plot simulation of a 1×32 array with phase aberration, electronic phase correction in azimuth, and mechanical phase correction in elevation.

The beam plot and contour map for a 1×32 deformable array when electronic phase aberration was applied in azimuth and the elements were mechanically tilted in elevation with each element pivoted about one end are illustrated in FIGS. 8A and 8B, respectively. Electronic phase correction in azimuth and mechanical phase correction in elevation left 25.4 ns of rms error—an improvement over azimuth phase correction alone. Ideally, removing the linear component of the aberrator in elevation in addition to removing the azimuth component would result in a residual phase aberration represented by:

$$\psi''(x,y)=Exy+Fy^2$$

The −6 dB and −18 dB worst case beam widths were 2.8 mm and 5.0 mm, respectively. The main beam of the beam plot exhibits this improvement; however, the side lobe level is still increased.

CASE 4

Figure 9B:
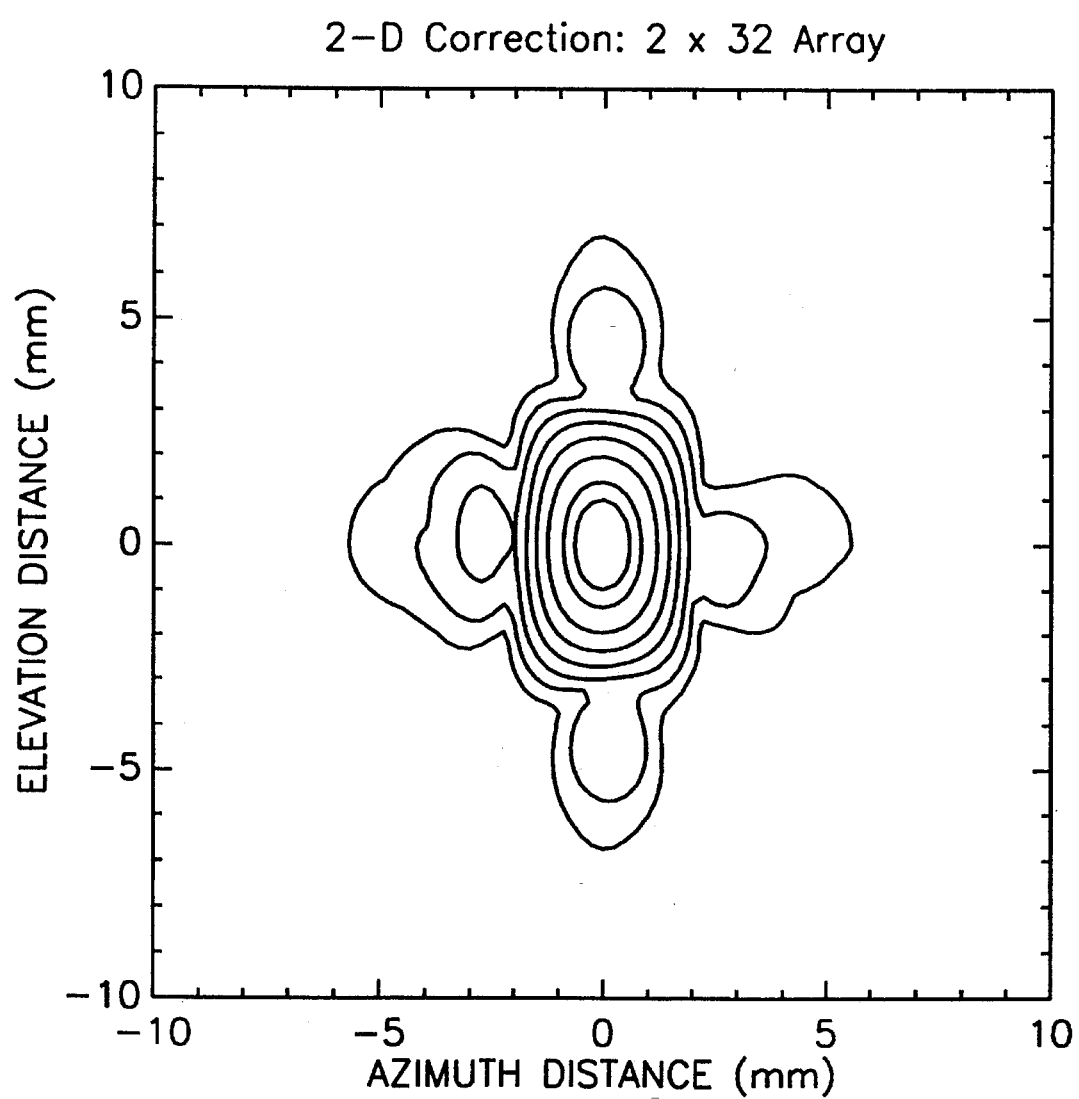
FIG. 9B is a contour plot simulation of a 2×32 array with phase aberration, electronic phase correction in azimuth, and mechanical phase correction in elevation.

The beam plot and contour map for a 2×32 deformable array where the linear component of the aberrator was removed in elevation to simulate mechanically tilting each element in elevation and electronic phase correction was applied in azimuth are illustrated in FIGS. 9A and 9B, respectively. A 2×32 transducer approximates the quadratic elevation aberration by two piecewise linear components that leave some smaller error in the quadratic term represented by the coefficient f such that:

$$\psi'''(x,y)=Exy+fy^2$$

This left a residual rms error of 20.4 ns. By correcting the azimuth phase errors and tilting the elements in elevation, the beam plot and contour map are corrected to near the control results as illustrated in FIGS. 9A and 9B, respectively. The −6 dB and −18 dB worst case beam widths were 2.6 mm and 4.6 mm, just as for the control case.

CASE 5

Figure 10B:
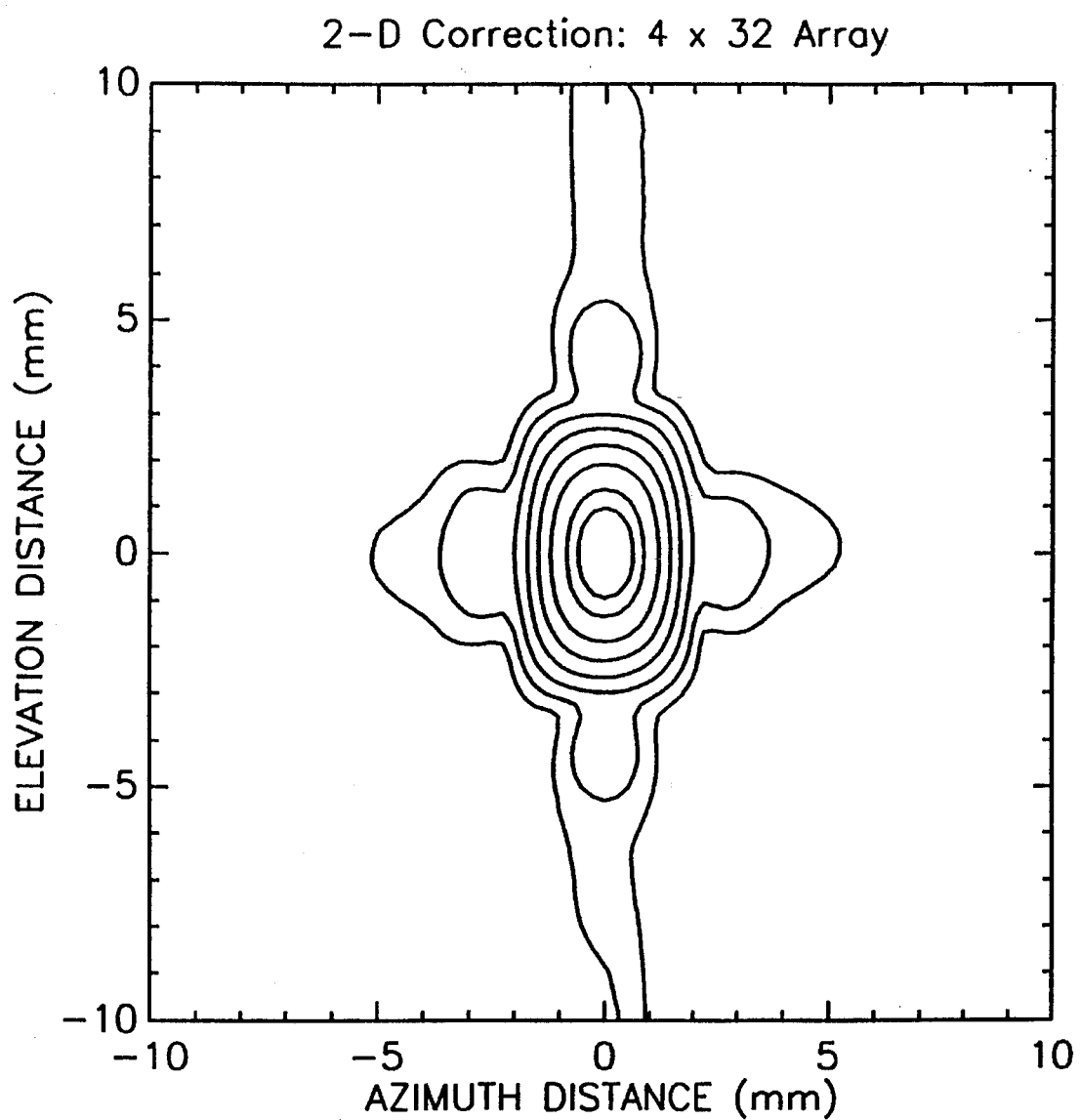
FIG. 10B is a contour plot simulation of 4×32 array with phase aberration and electronic phase correction in azimuth and elevation.

The beam plot and contour map illustrated in FIGS. 10A and 10B, respectively, are the results of a 4 by 32 array with electronic phase correction applied in two dimensions leaving a residual rms error of 14.5 ns. With an ideal, finely sampled two-dimensional array, the aberrator is completely removed leaving:

$$\psi''''(x,y)\approx 0$$

The beam plot and contour map are very similar to the control beam plot and contour map illustrated in FIGS. 5A and 5B, respectively. The −6 dB and −18 dB worst case beam widths were 2.6 mm and 4.6 mm just as for the control case.

Figure 11:
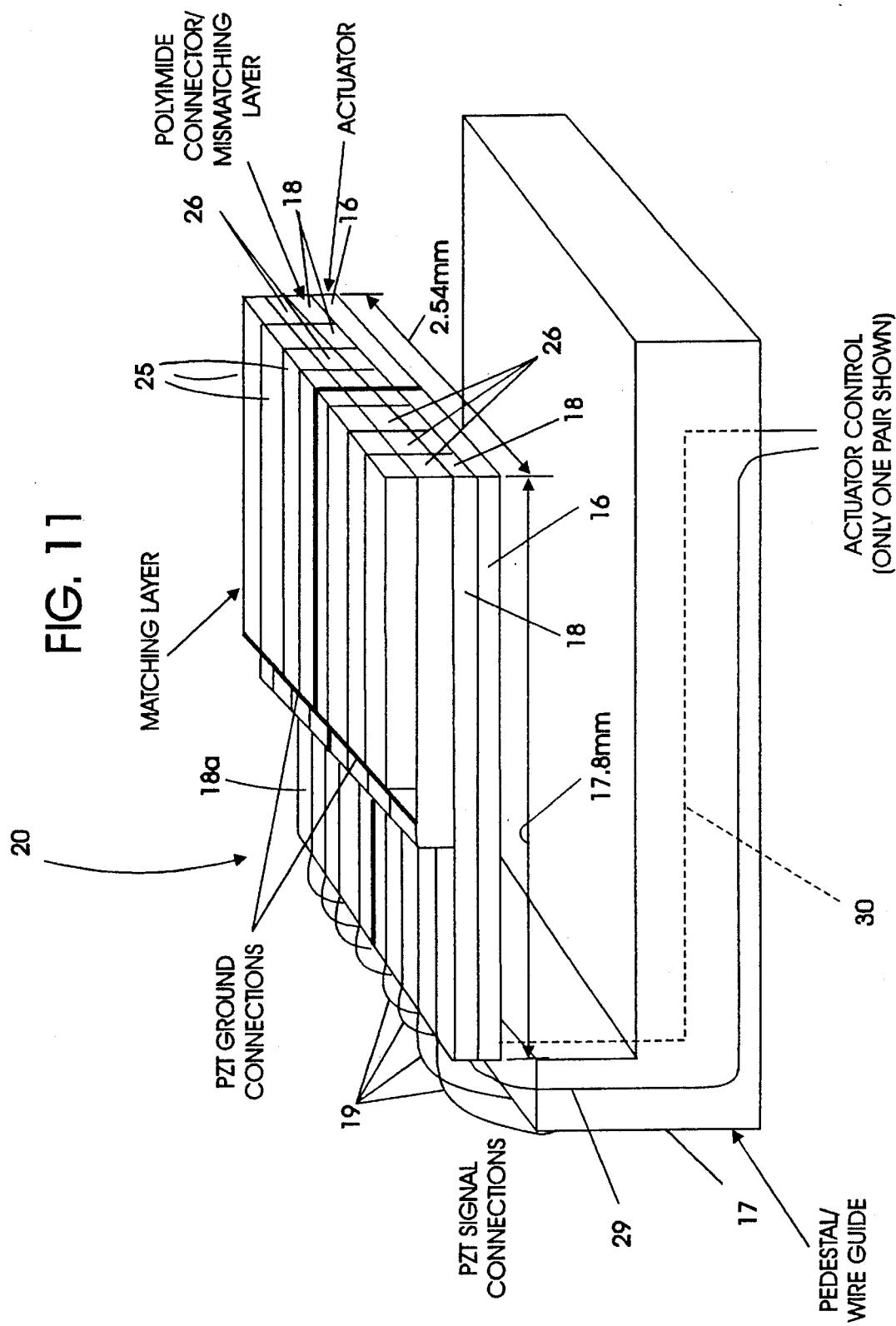
FIG. 11 illustrates a 1×32 deformable array according to the present invention.

Referring now to FIG. 11, an ultrasound transducer array according to the present invention is described. The transducer 20 is comprised of a plurality piezoelectric transducer elements 26 sandwiched between matching layers 25 and acoustically attenuating layers 18, and connected to actuators 16. The matching layers 25 are bonded to the piezoelectric transducer elements 26. The transducer elements 26 are also bonded to the upper surfaces 18a of the acoustically attenuating layers 18. The acoustically attenuating layers 18 are bonded to the actuators 16.

Chips of known piezoelectric transducer materials of high acoustic impedance are suitable for use in the present invention; however, lead zirconate titanate (PZT) is preferred. The lower surface of each piezoelectric transducer element 26 is connected to the upper surface 18a of an acoustically attenuating layer 18. The attenuating layer 18 provides an electrical connection to the piezoelectric transducer elements 26 as well as the mechanical connection between the piezoelectric transducer elements 26 and the actuator 16.

The thickness of the attenuating layer 18 is typically 0.1–10.0 mm and is made of epoxy with conductive or non-conductive fillers such as tungsten particles, tungsten oxide particles, aluminum oxide particles, phenolic balloon scatterers, glass balloon scatterers, rubber scatterers, and silicone scatterers with ranges of 1–100 microns.

A matching layer 25 is connected to the upper surface of each piezoelectric transducer element 26. The thickness of the matching layer 25 is preferably one fourth the wavelength ($\lambda/4$) of the frequency of operation of the transducer 20 and is referred to as the $\lambda/4$ matching layer. The matching layer 25 may be made of the same materials as the attenuating layer 18.

In a preferred embodiment, the transducer 20 comprises a RAINBOW (Reduced And Internally Biased Oxide Wafer) actuator 16 (developed by Haertling et al. at Clemson University and manufactured by Aura Ceramics, Inc., part #C3900, New Hope, Minn.). A RAINBOW actuator is a piezoelectric ceramic that has been chemically reduced on one side. A RAINBOW mounted as a cantilever produces deflection at the free end when an electric field is applied to electrodes connected thereto. The RAINBOWs generate greater displacement than bimorphs with the same voltage.

For example, a ±1° deflection is possible for a sample 12 mm in length at ±150 volts. Due to stresses that form during fabrication, the RAINBOWs may become slightly curved.

In the illustrated embodiment (FIG. 11), only two actuators 16 and eight PZT transducer array elements 26 are shown in the azimuth direction, for simplicity. Electrical connection to the transducer array elements 26 and the actuators 16 is made by a flexible polyimide, such as KAPTON® (a trademark of the E. I. DuPont de Nemours Company, Wilmington, Del.), connector 18. A mask for photolithography was designed, a piece of polyimide which was sputtered with chrome and gold was exposed to u.v. light, the photoresist was developed, and the metal was etched to form the electrode pattern. The flexible connector 18 reduces reverberations between the PZT transducer elements 26 and the actuators 16.

The actuator deflection is dependent on the voltage applied. Since each actuator 16 must deflect independently, a separate voltage must be applied to each actuator. By implementing a phase correction algorithm such as the speckle brightness method described by Nock et al. (*The Journal of the Acoustical Society of America*, vol. 85, 1819–1833, 1989), or the correlation method described by Flax et al. (*IEEE Transactions on Ultrasonics, Ferroelectrics, and Frequency Control*, vol. 35, 758–767, 1988), the amount of voltage necessary to tilt the actuator 16 will be determined. Specifically for the speckle brightness method described by Nock et al., the brightness of a chosen region of interest is calculated. Next, the actuator tilt is modified and the brightness of the region recomputed for the same region of interest. This process is repeated until the speckle brightness is maximized for the region of interest. The actuator position of the brightest calculation is the phase corrected position. By repeating the procedure for each actuator 16, the corrected elevation position is found.

Preferably, each actuator 16 should be able to tilt ±1°; each actuator should have a frequency response of at least 1 KHz for high speed phase correction; and the total length of each actuator should be less than 12 mm for scanning with a restricted acoustic window.

A deformable array, according to the present invention, is assembled as follows. A λ/4 epoxy (Ciba Geigy, Hawthorn, N.Y.) matching layer is bonded to a PZT transducer chip, preferably a 0.33 mm thick HD3203 from Motorola Ceramics (Albuquerque, N.M.), using the Papadakis method (*Journal of Adhesion* 3, 181–194, 1971). Preferably, the bonded matching layer and transducer chip are approximately square, having dimensions of 0.5 inch by 0.5 inch. The bonded PZT transducer chip and matching layer are then bonded to the flexible polyimide connector with silver epoxy (Chomerics 584, Woburn, Mass.) using a bonding jig (Logitek, Greensboro, N.C.). Next, the array is diced with a dicing saw, for example, a model 782 Kulicke & Soffa or equivalent (Willow Grove, Pa.) into linear array elements 26 having dimensions of approximately 0.318 mm by 12.7 mm (0.0125" by 0.5") with a 0.1 mm kerf. The dicing saw cuts completely through the matching layer 25 and transducer chip 26, and partly through the flexible connector 18.

After dicing, a 0.152 mm silver ribbon (not shown) such as the type manufactured by Sigmund-Cohn (Mr. Vernon, N.Y.) is stitched by wire bonding across all of the elements 26 of the array to provide grounding using a wire bonder such as a Hughes Wire Bonder model MCW-550 (Carlsbad, Calif.) or equivalent. Silver ribbons are also aligned and secured to the backside of the polyimide connector 18 with cyanoacrylate.

In the illustrated embodiment, the base member 17 is drilled with ten holes (not shown) at a spacing of 1.27 mm.

Eight of the holes provide electrical connection to the bottom electrode (not shown) of the actuator 16; the remaining two holes serve as guidance marks. The holes are filled with silver epoxy, and then wires 30 are inserted into the holes. Using silver epoxy, each actuator 16 is bonded to the base member 17. The bonded PZT transducer chip, matching layer, and flexible connector are then bonded to an actuator 16, which has a portion secured to a base member with silver epoxy to make the electrical connection from the actuator top electrode (not shown) to the silver ribbons on the backside of the polyimide. Each actuator 16 typically has dimensions of approximately 1 inch in length by 0.5 inches in width.

The array is diced again to physically separate the actuator into 8 individual actuators 16, each with 4 linear array elements 26. The dicing saw is lined up to cut in the kerf of the linear array elements 26. A cut is made between every four array elements 26 to produce 32 linear array elements divided between 8 actuators 16.

Indium solder, preferably Indalloy #2 (Indium Corporation of America, Utica, N.Y.) is used to connect 0.254 mm silver wires of the type manufactured by Sigmund-Cohn (Mr. Vernon, N.Y.) to the electrodes of the polyimide connector 18. These wires are soldered to a connector for the transducer handle (not shown) which interfaces with a Siemens 1200 phased array scanner, and the actuator wires are soldered to a separate connector to provide the actuator control. The final step is to cover any exposed wiring with copper tape for electrical shielding.

A base unit for controlling the actuators and for supplying power to the transducer elements is typically provided in an independent housing, as would be understood by those having skill in the art. See, for example, U.S. Pat. No. 5,419,329 to Smith et al., which is incorporated herein by reference in its entirety.

An elevation lens may be used to focus the ultrasound beam in elevation. Acoustically transparent material should be used in the transducer housing for contact with the patient. A non-conductive, low-attenuation fluid should be used in the transducer housing for high frequency transducers.

APPARATUS TESTING

The performance of single elements of the transducer was assessed by examining the vector impedance, the pulse-echo response, and the pulse-echo bandwidth. Also examined was the array performance with measured pulse-echo beam plots. The vector impedance of individual array elements was measured using a Hewlett-Packard 4193A Vector Impedance Meter. Each vector impedance measurement was completed in air to determine the element resonance and the presence of undesired modes of vibration.

Both the pulse-echo sensitivity and the pulse-echo bandwidth measurements were made in vegetable oil since that was the medium used for imaging. The actuator control voltage can be as much as 300 volts DC. Therefore, the apparatus was not immersed in water since the high DC control voltages would allow conduction through the water. Instead, oil, which has a much lower conductivity, was used as the sound transmission medium. The pulse-echo sensitivity from a block at a range of 6 cm was measured using a Metrotek Model 215 Transmitter to generate a 200 V spike, and the return echo was received with a Model 101 Receiver. The power spectrum was measured using a Panametrics 5052G Stepless Gate and a Hewlett-Packard 3588A Spectrum Analyzer.

One dimensional azimuth and elevation translation beam plots in oil were also measured. A 1.5 mm rod ground to a hemispherical cap was used as the point target which was manually scanned to acquire the beam plot. The rod was scanned a total of 20 mm at 0.5 mm increments. At each location, the maximum voltage of the rf sum was recorded from the Siemens 1200 beam-former. This procedure was used to obtain beam plots in azimuth and elevation for two conditions. The first set was measured with the actuators in the normal or co-planar position. For the second set of beam plots, actuators 2, 3, 6, and 8 were tilted 1°. Simulated beam plots were generated with the broad band simulation program developed by Jensen et al., (*IEEE Transactions on Ultrasonics, Ferroelectrics, and Frequency Control*, vol. 39, 262–267, 1992), under equivalent conditions as the measured beam plots for comparison.

RESULTS

Figure 12A:
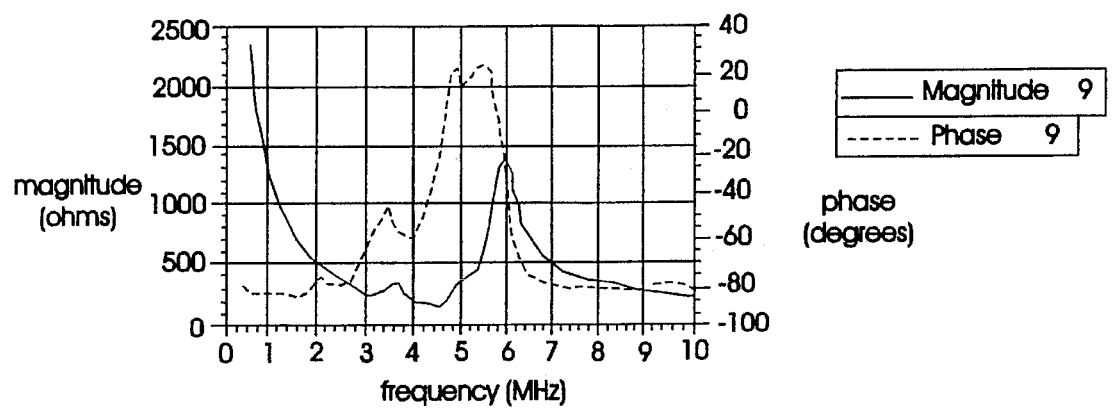
FIG. 12A illustrates the vector impedance of a typical PZT array element in air.
Figure 12B:
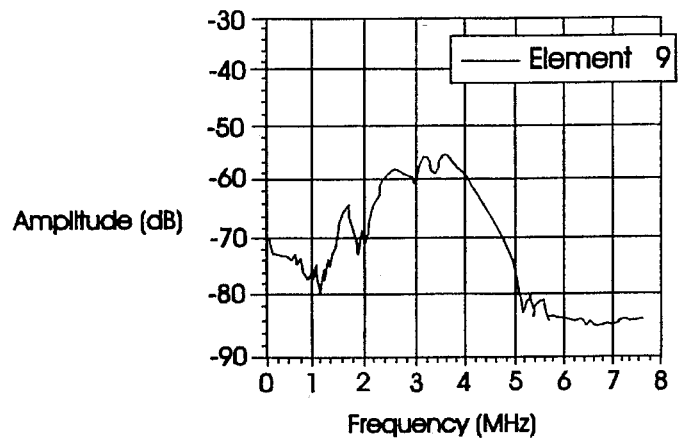
FIG. 12B illustrates the power spectrum of a typical PZT array element.

FIG. 12A illustrates the vector impedance of a typical PZT array element of the deformable transducer in air. The resonance at 3.5 MHz is due to the epoxy matching layer. The double peaked resonance at 5 MHz is interaction of the resonance of the PZT element and the actuator. Although there was a flexible connector between the PZT elements and the actuator, the slight curve of the actuator made it very difficult to achieve a thin bond. Therefore, the flexible connector does not eliminate the possibility of sound resonating in the actuator. The only other mode visible in the impedance plot is a slight width mode at 9.5 MHz. The associated spectrum, FIG. 12B, is shown for the same single element of the transducer. The −6 dB width of the element is 60% which was typical for the array.

Figure 13A:
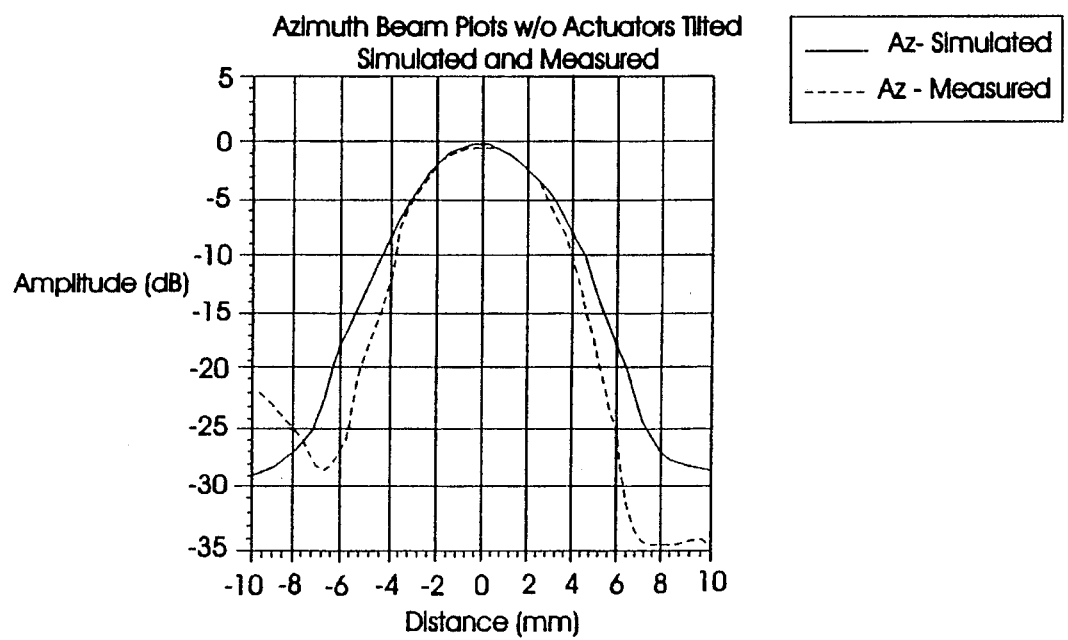
FIG. 13A illustrates measured and simulated azimuth beam plots with transducer in control position.
Figure 13B:
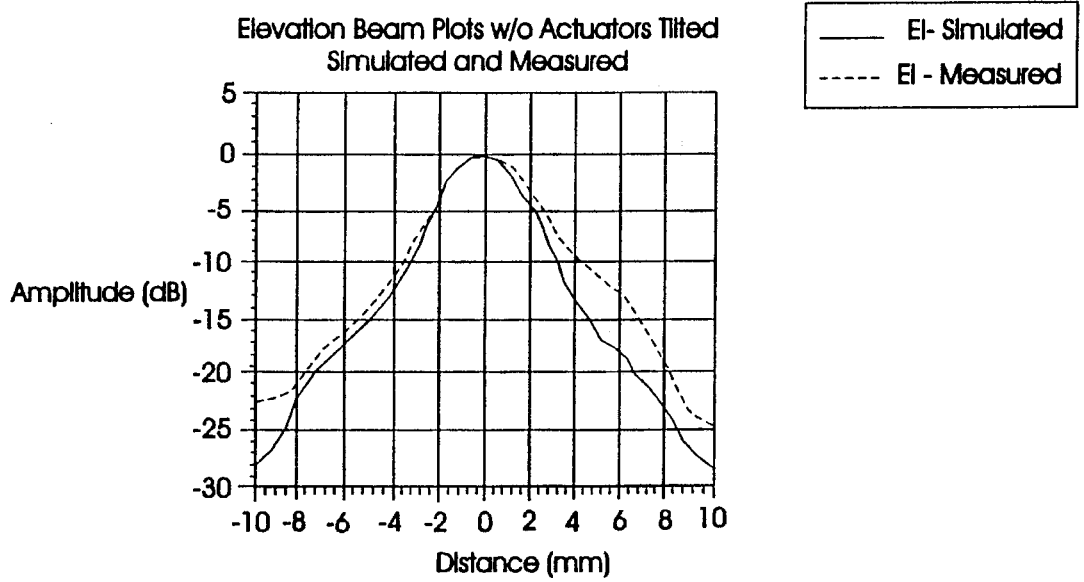
FIG. 13B illustrates measured and simulated elevation beam plots with transducer in control position.

Referring now to FIGS. 13A and 13B, the measured and simulated pulse-echo beam plots for the deformable transducer when the actuators were in the control or co-planar position are illustrated. Since the deformable transducer array was unfocused in elevation, the beam plots were measured and simulated at a depth of 11 cm to be in the far field of the elevation dimension. FIG. 13A compares the measured and simulated azimuth one dimensional beam plots with the deformable transducer in the control position. The −6 dB beam width is 6.25 mm for the measured beam plot in azimuth and 6.5 mm for the simulated beam plot in azimuth. The one dimensional beam plots of FIG. 13B compare the measured and simulated elevation beam plots when actuators were in the control position. The −6 dB beam width is 5.25 mm for the measured elevation beam plot and 5.0 mm for the simulated elevation beam plot. Both the azimuth and elevation measured beam plots agree well with the simulated azimuth and elevation beam plots.

Figure 14A:
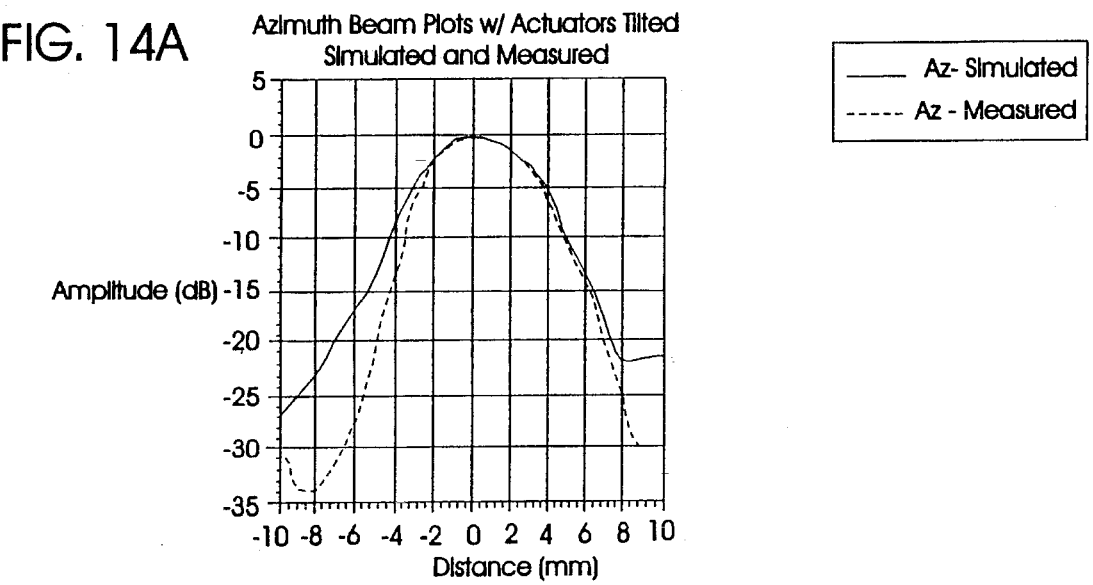
FIG. 14A illustrates measured and simulated azimuth beam plots with the actuators tilted.
Figure 14B:
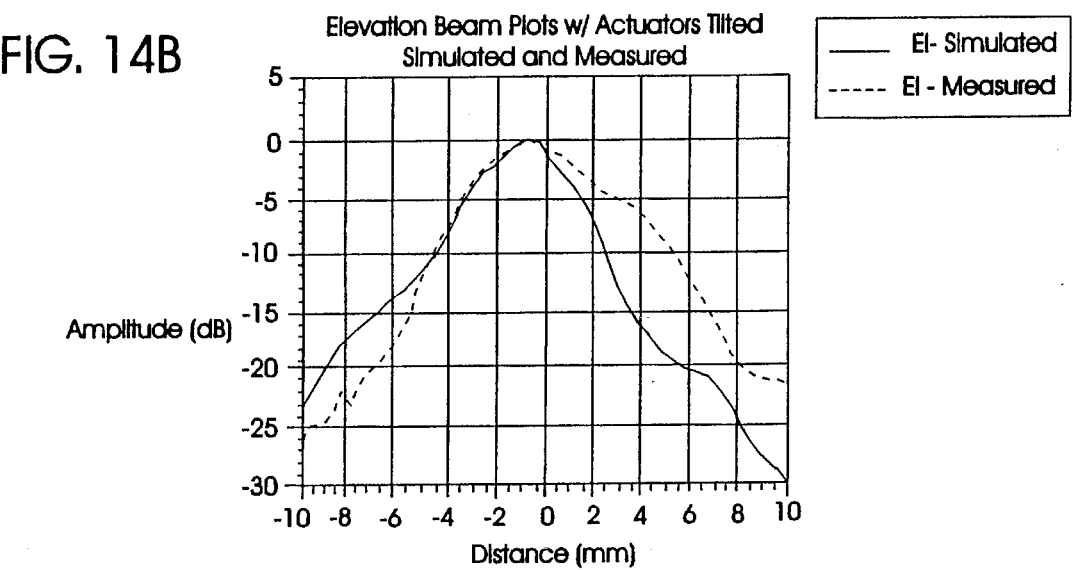
FIG. 14B illustrates measured and simulated elevation beam plots with the actuators tilted.

Referring now to FIGS. 14A and 14B, the measured and simulated beam plots when actuators 2, 3, 6, and 8 were tilted 1°, are illustrated. FIG. 14A compares the measured and simulated azimuth beam plots with the actuators tilted. In azimuth, the −6 dB beam width is 6.75 mm for the measured beam plot and 7.25 mm for the simulated beam plot. FIG. 14B compares the measured and simulated elevation beam plots with the actuators tilted. The measured −6 dB beam width in elevation is 7.5 mm, and the simulated beam width in elevation is 5.25 mm. The measured azimuth and elevation beam plots with actuators 2, 3, 6, and 8 tilted are in reasonable agreement with the simulated azimuth and elevation beam plots.

By combining electronic phase correction in azimuth and mechanically tilting the elements in elevation, a simpler 1×N or 2×N deformable array can approach the image quality of an array of 4×N elements or greater. Mechanically tilting the elements only partially corrects phase aberrations since it removes the linear component, or the steering error, of the phase aberration. That means that tilting the elements in elevation eliminates the problem of adjacent azimuthal elements steering in different directions. A phased array scanner incorporating a 1×N or 2×N deformable transducer is lower in cost and simpler than a full M x N two-dimensional array, yet significantly improves ultrasound image quality.

Figure 15:
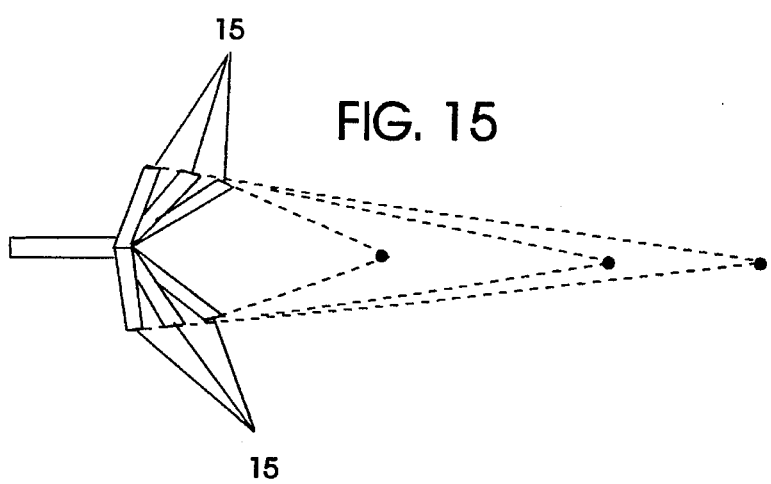
FIG. 15 illustrates a deformable array with actuators tilted at three different angles for three different depths of elevation focusing.

The ultrasound beam from a conventional linear array can be electronically focused in azimuth which allows the depth of the azimuth focus to be altered on-line. However, since the linear array cannot be electronically focused in elevation, a mechanical lens is used to focus the beam at a fixed depth in elevation. The deformable array according to the present invention is not limited by a fixed elevation focus. By physically tilting the transducer array elements 15 in elevation with the actuators, the array can be focused in elevation as shown in FIG. 15. Tilting the elements 15 in elevation provides a linear approximation to the desired spherical focus. In transmit, the elevation focus can be adjusted by changing the elevation tilt of the actuators just before the transmit signals are sent to the PZT elements. Therefore, the transmit elevation focus can be adjusted on-line with a push of a button. In receive, the actuators can be tilted at a specific angle to focus the ultrasound beam at a single depth. A more desirable option would be to implement dynamic receive focusing with the actuators. By driving the actuators with an appropriate control signal, continuous dynamic receive focusing could be implemented. The control signal would continuously match the elevation focus, or the tilt of the actuators, to the depth of the returning echo. Continuous dynamic receive focusing would require the actuators to respond in looks for a typical scan depth of 150 mm.

The RAINBOW actuators may be curved as a result of stresses induced during fabrication. The curvature would improve the ability of the transducer to focus the ultrasound beam in elevation since the curvature is a better match to the desired spherical focus.

Figure 16:
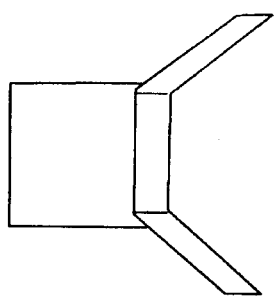
FIG. 16 illustrates a 3×N deformable array.

The deformable array is not limited to a 1×N or 2×N design. Additional more complicated configurations are also possible such as the 3×N design illustrated in FIG. 16.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A medical ultrasound imaging array transducer assembly configured for insertion in or contacting to the human body and having two-dimensional phase correction capability, said assembly comprising:

a base member;

a plurality of transducer elements secured to said base member; and at least one actuator connected to said base member and at least one of said transducer elements for deflecting said at least one transducer element in elevation relative to at least one other transducer element thereby providing phase correction capability in two dimensions.

2. A device according to claim 1, wherein said at least one transducer element may deflect by at least ±1°.

3. A device according to claim 1, wherein said at least one actuator has a frequency response of at least 1 KHz.

4. A device according to claim 1, wherein said at least one actuator is a piezoelectric ceramic.

5. A medical ultrasound array transducer assembly configured for insertion in or contacting to the human body and having phase correction capability, said assembly comprising:
   a base member;
   a plurality of transducer elements secured to said base member; and
   at least one actuator connected to said base member and at least one of said transducer elements for deflecting said at least one transducer element relative to at least one other transducer element thereby providing phase correction capability in at least one dimension,
   wherein each one of said plurality of transducer elements comprises:
   an acoustically attenuating layer connected to the upper surface of said at least one actuator;
   a piezoelectric transducer chip connected to said attenuating layer; and
   a matching layer having an upper surface and a lower surface wherein said lower surface of said matching layer is connected to said piezoelectric transducer chip.

6. A device according to claim 5, wherein said attenuating layer is polyimide.

7. A device according to claim 5, wherein said matching layer is polyimide.

8. A device according to claim 5, wherein said piezoelectric transducer chip is a PZT chip.

9. A device according to claim 1, further comprising means associated with each of said plurality of transducer elements, for electronically correcting ultrasound beam phase errors.

10. A medical ultrasound imaging array transducer system configured for insertion in or contacting to the human body and having two-dimensional phase correction capability, said system comprising:
   a) a transducer array assembly comprising:
      a base member;
      a plurality of transducer elements secured to said base member; and
      at least one actuator connected to said base member and at least one of said transducer elements for deflecting said at least one transducer element relative to at least one other transducer element; and
   b) a base unit operatively associated with said transducer array assembly, said base unit comprising:
      control means associated with said at least one actuator for mechanically correcting ultrasound beam phase errors in a first dimension.

11. A system according to claim 10, wherein said at least one transducer element may deflect by at least ±1°.

12. A system according to claim 10, wherein said at least one actuator has a frequency response of at least 1 KHz.

13. A system according to claim 10, wherein said at least one actuator is a piezoelectric ceramic.

14. A medical ultrasound array transducer system configured for insertion in or contacting to the human body and having a two-dimensional phase correction capability, said system comprising:
   a) a transducer array assembly comprising:
      a base member;
      a plurality of transducer elements secured to said base member; and
      at least one actuator connected to said base member and at least one of said transducer elements for deflecting said at least one transducer element relative to at least one other transducer element; and
   b) a base unit operatively associated with said transducer array assembly, said base unit comprising:
      control means associated with said at least one actuator for mechanically correcting ultrasound beam phase errors in a first dimension, and
      wherein each one of said plurality of transducer elements comprises:
      an attenuating layer of material connected to the upper surface of said at least one actuator;
      a piezoelectric transducer chip connected to said attenuating layer; and
      a matching layer of material having an upper surface and a lower surface wherein said lower surface of said matching layer is connected to said piezoelectric transducer chip.

15. A system according to claim 14, wherein said attenuating layer is polyimide.

16. A system according to claim 14, wherein said matching layer is polyimide.

17. A system according to claim 14, wherein said piezoelectric transducer chip is a PZT chip.

18. A method for achieving two-dimensional phase correction of an aberrated ultrasound beam received by a medical ultrasound array transducer assembly comprising a plurality of transducer elements and configured for insertion in or contacting to the human body, said method comprising the steps of:
   a) mechanically correcting ultrasound beam phase errors in a first dimension; and
   b) electronically correcting ultrasound beam phase errors in a second dimension.

19. A method according to claim 18, wherein said step of mechanically correcting ultrasound beam phase errors in a first dimension comprises tilting said plurality of transducer elements.

20. A method according to claim 18, wherein said step of electronically correcting ultrasound beam phase errors in a second dimension comprises altering the electronic phase delay of said plurality of transducer elements.

21. A method according to claim 18, wherein said step of mechanically correcting ultrasound beam phase errors in a first dimension and said step of electronically correcting ultrasound beam phase errors in a second dimension occur simultaneously.

22. A base unit for a medical ultrasound imaging array transducer assembly comprising at least one transducer element and at least one actuator, said base unit comprising:
   control means associated with said at least one actuator for mechanically correcting ultrasound beam phase errors in an elevation dimension; and
   a power supply.

23. A method for focusing an ultrasound beam in two dimensions by a medical ultrasound array transducer assembly comprising a plurality of transducer elements and configured for insertion in or contacting to the human body, said method comprising the steps of:
   a) mechanically focusing the ultrasound beam in a first elevation dimension; and
   b) electronically focusing the ultrasound beam in a second dimension.

24. A method according to claim 23, wherein said step of mechanically focusing the ultrasound beam in a first dimension comprises tilting said plurality of transducer elements.

25. A method according to claim 23, wherein the focused ultrasound beam is transmitted by the transducer assembly.

26. A method according to claim 23, wherein the focused ultrasound beam is received by the transducer assembly.

* * * * *